(12) United States Patent
Lee et al.

(10) Patent No.: US 10,592,212 B2
(45) Date of Patent: Mar. 17, 2020

(54) SYSTEM AND METHOD FOR SOFTWARE DEVELOPMENT BASED ON PROCEDURES

(71) Applicant: SAMSUNG ELECTRONICS CO., LTD., Suwon-si, Gyeonggi-do (KR)

(72) Inventors: Woo-Yong Lee, Suwon-si (KR); Do-Young Lee, Suwon-si (KR); Tae-Il Eom, Suwon-si (KR); Jae-Ho Song, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/694,060

(22) Filed: Sep. 1, 2017

(65) Prior Publication Data
US 2018/0113679 A1 Apr. 26, 2018

Related U.S. Application Data

(60) Provisional application No. 62/410,906, filed on Oct. 21, 2016, provisional application No. 62/426,879, filed on Nov. 28, 2016.

(30) Foreign Application Priority Data

Feb. 28, 2017 (KR) .......................... 10-2017-0026665

(51) Int. Cl.
*G06F 8/20* (2018.01)
*G06F 8/70* (2018.01)
(Continued)

(52) U.S. Cl.
CPC ............ *G06F 8/22* (2013.01); *G06F 11/3604* (2013.01); *G06F 11/3688* (2013.01); *G06F 8/33* (2013.01);
(Continued)

(58) Field of Classification Search
CPC ... G06F 8/22; G06F 8/314; G06F 8/34; G06F 8/35; G06F 8/40; G06F 8/41; G06F 8/70;
(Continued)

(56) References Cited

U.S. PATENT DOCUMENTS 5,657,428 A * 8/1997 Tsuruta .................. G06N 5/003
706/46
5,832,239 A * 11/1998 Gavin .................... G06F 13/385
710/105

(Continued)

FOREIGN PATENT DOCUMENTS

JP         4200581     12/2008
KR     1020020095723   12/2002
(Continued)

OTHER PUBLICATIONS

Sengupta, B., et al., Triggered message sequence charts, ACM SIGSOFT Software Engineering Notes, vol. 27 Issue 6, Nov. 2002, pp. 167-176, [retrieved on Oct. 31, 2019], Retrieved from the Internet.*

(Continued)

*Primary Examiner* — Geoffrey R St Leger
(74) *Attorney, Agent, or Firm* — F. Chau & Associates, LLC

(57) ABSTRACT

A method of developing software including a plurality of actors executable in parallel includes obtaining first input data including information regarding a plurality of procedures defining a series of messages between a first actor and at least one second actor from among the plurality of actors, obtaining second input data including information regarding relationships between the plurality of procedures, generating control data by interpreting the first and second input data, and controlling the plurality of procedures by processing the series of messages using the control data.

5 Claims, 20 Drawing Sheets

(51) Int. Cl.
*G06F 8/33* (2018.01)
*G06F 8/34* (2018.01)
*G06F 11/36* (2006.01)

(52) U.S. Cl.
CPC ............... *G06F 8/34* (2013.01); *G06F 8/70* (2013.01); *G06F 11/3692* (2013.01)

(58) Field of Classification Search
CPC .............. G06F 11/263; G06F 11/3668; G06F 11/3672; G06F 11/3684; G06F 11/3688; G06F 11/3692
USPC ........ 717/105, 113, 119, 124, 136, 137, 140
See application file for complete search history.

(56) References Cited

U.S. PATENT DOCUMENTS

| | | | |
|---|---|---|---|
| 6,408,430 B2 | 6/2002 | Gunter et al. | |
| 6,415,396 B1* | 7/2002 | Singh | G06F 11/3688 714/25 |
| 6,584,488 B1* | 6/2003 | Brenner | G06F 9/5011 718/103 |
| 7,185,322 B2* | 2/2007 | McCullough | G06F 8/41 717/136 |
| 7,275,231 B2* | 9/2007 | Murthy | G06F 17/5009 716/106 |
| 7,350,188 B2* | 3/2008 | Schulz | G06Q 10/06 709/205 |
| 7,523,425 B2 | 4/2009 | Bunin et al. | |
| 7,849,439 B2* | 12/2010 | Green | G06F 8/74 717/105 |
| 8,266,224 B2* | 9/2012 | Ramarao | G06Q 10/10 709/206 |
| 8,365,112 B2 | 1/2013 | Oishi et al. | |
| 8,640,084 B2 | 1/2014 | Murthy | |
| 8,789,058 B2* | 7/2014 | Li | G06F 9/4843 709/203 |
| 8,799,869 B2 | 8/2014 | Grechanik | |
| 8,924,976 B2* | 12/2014 | Park | G06F 9/4887 718/100 |
| 9,535,627 B2* | 1/2017 | Roberts | G06F 3/0659 |
| 2004/0068479 A1* | 4/2004 | Wolfson | G06F 16/273 |
| 2004/0187089 A1* | 9/2004 | Schulz | G06Q 10/06 717/101 |
| 2004/0205136 A1* | 10/2004 | Whittenberger | G06Q 10/10 709/206 |
| 2005/0144596 A1* | 6/2005 | McCullough | G06F 8/41 717/136 |
| 2006/0059444 A1* | 3/2006 | Murthy | G06F 17/5009 716/106 |
| 2008/0077382 A1 | 3/2008 | Strehl | |
| 2011/0197172 A1 | 8/2011 | Yamamoto et al. | |
| 2012/0246651 A1* | 9/2012 | Li | G06F 9/4843 718/101 |
| 2013/0055276 A1* | 2/2013 | Park | G06F 9/4887 718/103 |
| 2015/0286469 A1 | 10/2015 | Weigert et al. | |

FOREIGN PATENT DOCUMENTS

| | | |
|---|---|---|
| KR | 10-0621573 | 8/2006 |
| KR | 10-1095858 | 12/2011 |
| KR | 10-1587279 | 1/2016 |

OTHER PUBLICATIONS

Uchitel, S., et al., A workbench for synthesising behaviour models from scenarios, Proceedings of the 23rd International Conference on Software Engineering, May 12-19, 2001, pp. 188-197, [retrieved on Oct. 31, 2019], Retrieved from the Internet.*

* cited by examiner

| Procedure | Procedure Group | | |
|---|---|---|---|
| | Idle | Conn | Etc |
| Reselection | √ | | √ |
| Reconfiguration | | √ | √ |
| Paging | √ | | |
| SI Reading | √ | √ | |
| PLMN Scan | √ | | |
| Handover | | √ | √ |

SYSTEM AND METHOD FOR SOFTWARE DEVELOPMENT BASED ON PROCEDURES

CROSS-REFERENCE TO RELATED APPLICATIONS

This application, under 35 U.S.C. § 119, claims the benefit of U.S. Provisional Application No. 62/410,906, filed on Oct. 21, 2016 and U.S. Provisional Application No. 62/426,879, filed on Nov. 28, 2016, in the U.S. Patent Office and priority to Korean Patent Application No. 10-2017-0026665, filed on Feb. 28, 2017, in the Korean Intellectual Property Office, the disclosures of which are incorporated by reference herein in their entireties.

TECHNICAL FIELD

Exemplary embodiments of the inventive concept relate to software development, and more particularly, to a system and method for software development.

DISCUSSION OF RELATED ART

Performance of a hardware device including a processor may depend on software executed by the processor. As specifications of hardware devices need to be more efficient, software may become increasingly sophisticated. Completion of software with high reliability within a short development period may increase not only efficiency of a hardware device, but also productivity thereof.

SUMMARY

According to an exemplary embodiment of the inventive concept, a method of developing software including a plurality of actors executable in parallel may be implemented by a computing system and include obtaining first input data including information regarding a plurality of procedures defining a series of messages between a first actor and at least one second actor from among the plurality of actors, obtaining second input data including information regarding relationships between the plurality of procedures, generating control data by interpreting the first and second input data, and controlling the plurality of procedures by processing the series of messages using the control data.

According to an exemplary embodiment of the inventive concept, a computing system for developing software including a plurality of actors that are executable in parallel includes at least one processor and a memory. The processor is configured to perform operations including obtaining first input data by displaying at least one of a plurality of procedures as a message sequence chart (MSC), where the first input data includes information regarding the plurality of procedures defining a series of messages between a first actor and at least one second actor from among the plurality of actors, generating control data using the first input data, obtaining function data including information regarding operations in which the plurality of procedures process the series of messages, and controlling the plurality of procedures by processing the series of messages using the control data and the function data.

According to an exemplary embodiment of the inventive concept, a method of operating a procedure control framework in a software development platform includes obtaining control data including information regarding a plurality of procedures defining a series of messages and information regarding relationships between the plurality of procedures, determining that a message is received, determining a type of the message as one of a procedure trigger message, a procedure internal message, and an arbitrary message, performing a first operation when the type of the message is the procedure internal message or the arbitrary message, and performing a second operation when the type of the message is the procedure trigger message. The second operation includes generating a first procedure using the control data, determining a relationship between the first procedure and a second procedure in a run queue of the procedure control framework by using the control data, and performing a third operation according to the determined relationship.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
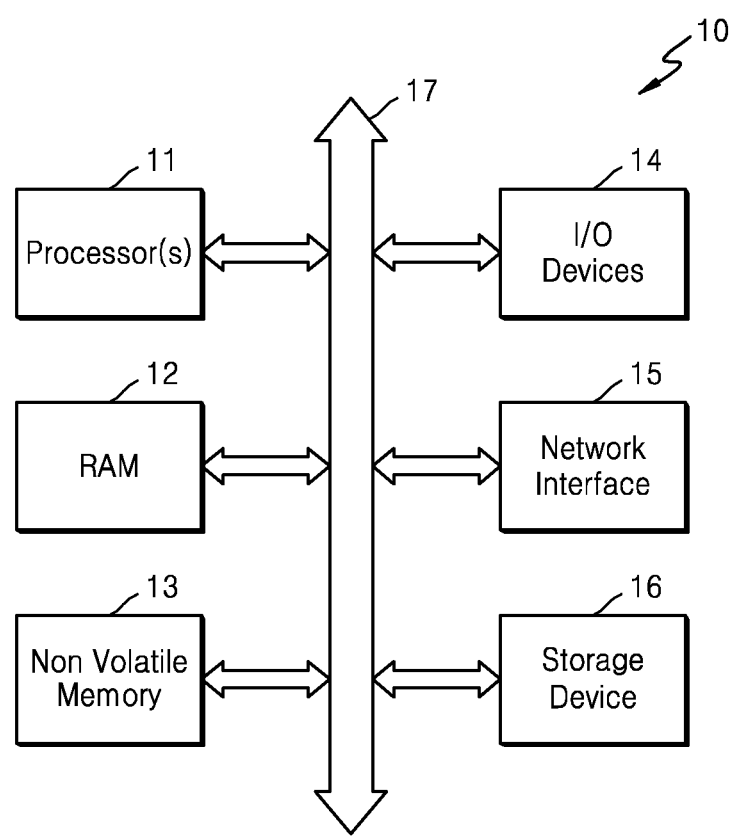
FIG. 1 is a block diagram of a computing system for software development, according to an exemplary embodiment of the inventive concept.

Exemplary embodiments of the inventive concept will be described more fully hereinafter with reference to the accompanying drawings. Like reference numerals may refer to like elements throughout this application.

Exemplary embodiments of the inventive concept relate to software development and provide a system and a method for software development based on procedures.

FIG. 1 is a block diagram of a computing system for software development according to an exemplary embodiment of the inventive concept. A computing system 10 may be a stationary computing system, such as a desktop computer, a workstation, or a server, or a portable computing system, such as a laptop computer. As shown in FIG. 1, the computer system 10 may include processor(s) 11, a random access memory (RAM) 12, a non-volatile memory 13, input/output (I/O) devices 14, a network interface 15, and a storage device 16. The processor(s) 11, the random access memory (RAM) 12, the non-volatile memory 13, the I/O devices 14, the network interface 15, and the storage device 16 may be connected to a bus 17 and may communicate with one another via the bus 17.

The processor(s) 11 may be referred to as a processing unit and may include a core capable of executing an arbitrary set of commands (e.g., Intel Architecture-32 (IA-32), 64-bit extended IA-32, x86-64, PowerPC, Sparc, MIPS, Advanced RISC Machine (ARM), IA-64, etc.), such as a microprocessor, an application processor (AP), a digital signal processor (DSP), or a graphics processing unit (GPU).

The processor(s) 11 may access a memory, e.g., the RAM 12 or the non-volatile memory 13, via the bus 17 and execute commands stored in the RAM 12 or the non-volatile memory 13. For example, the RAM 12 or the non-volatile memory 13 may store a program (or a software development platform) for software development according to an exemplary embodiment of the inventive concept o at least a portion thereof, and the program may instruct the processor(s) 11 to execute the software development platform.

As a communication protocol is one application of software, it not only demands real-time operations but also exhibits high complexity, and thus, software for a communication protocol may be modularized layer by layer using a layered architecture. Therefore, the software for a communication protocol may be developed to have a message-driven multi-thread structure. A procedure is a sequence of operations for performing an action. In the present disclosure, a procedure may refer to a process in which an actor exchanges one or more messages with one or more other actors and may be a unit expressed as one message sequence chart (MSC). For example, a procedure may refer to a unit of operations performed by a thread to process a series of messages, and one thread may perform a plurality of procedures.

A framework may be essential for developing software with high complexity, and the framework may take into account a relationship between procedures to correctly process a series of messages related to a given procedure for multi-threaded software and control the procedures. As will be described below, a system and a method for software development according to an exemplary embodiment of the inventive concept provides a framework for separating a portion (e.g., control logic) for sequentially processing a series of messages and handling a relationship between the procedures and a portion (e.g., functional logic) for actually processing a procedure by using message parameters. Thus, complexity of software development may be reduced, while maintainability may be increased.

The non-volatile memory 13 may not lose stored data even when power supplied to the computing system 10 is blocked and may include a non-volatile memory, e.g., an electrically erasable programmable read-only memory (EEPROM), a flash memory, a phase change random access memory (PRAM), a resistance random access memory (RRAM), a NANO floating gate memory (NFGM), a polymer random access memory (PoRAM), a magnetic random access memory (MRAM), a ferroelectric random access memory (FRAM), etc.

The I/O devices 14 may include an input device, such as a keyboard or a pointing device, and may include an output device, such as a display device or a printer. For example, a user may trigger execution of a method for software development by the processor(s) 11 via the I/O devices 14, may input at least portions of first and second input data D_IN1 and D_IN2 or at least a portion of function data D_FUN, and may check an MSC provided by an MSC editor, which will be described in more detail below.

The network interface 15 may provide access to a network outside the computing system 10. For example, a network may include a plurality of interconnected computing systems and communication links, and the communication links may include wired links, optical links, wireless links, or any other type of links.

The storage device 16 may include a non-volatile memory and/or may include a storage medium, such as a magnetic tape, an optical disk, or a magnetic disk. Furthermore, the storage device 16 may be removable from the computing system 10. The storage device 16 may store a program according to an exemplary embodiment of the inventive concept and, before the program is executed by the processor(s) 11, the program or at least a portion thereof may be loaded to the RAM 12 or the non-volatile memory 13. Alternatively, the storage device 16 may store a file written in a programming language, and a program generated by a compiler or at least a portion of the program may be loaded from the file to the RAM 12 or the non-volatile memory 13.

The storage device 16 may store data to be processed by the processor(s) 11 or data processed by the processor(s) 11. In other words, the processor(s) 11 may generate data by processing the data to be processed, which is stored in the storage device 16, according to a program, and may store the generated data in the storage device 16. For example, the storage device 16 may store control data D_CTR and/or the function data D_FUN (refer to FIG. 2) and may also store test data T_DAT (e.g., like a test data store 500 of FIG. 9).

Figure 2:
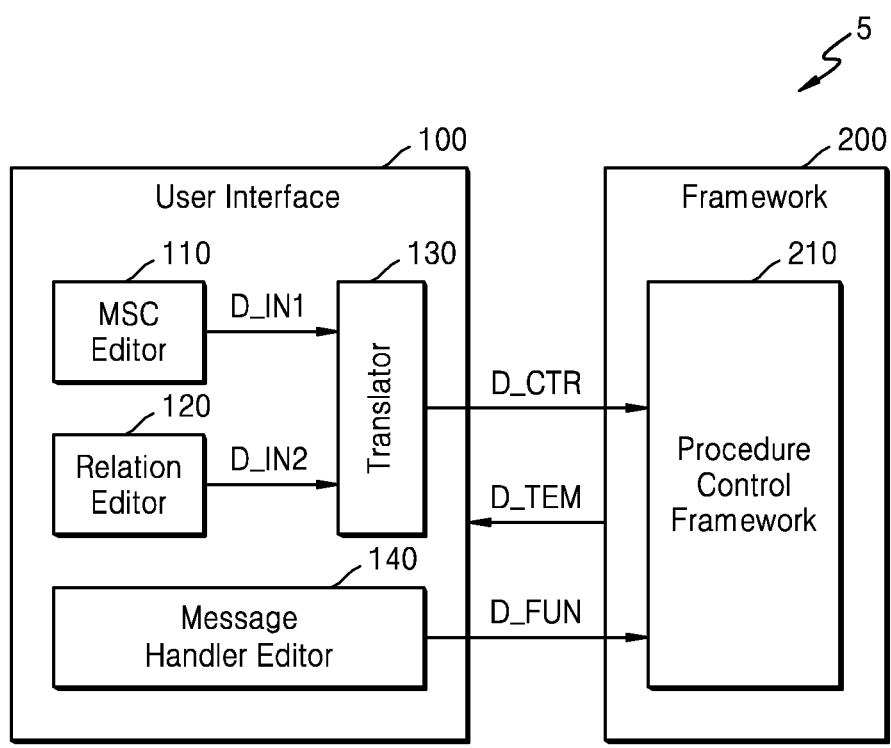
FIG. 2 is a block diagram of a software development platform according to an exemplary embodiment of the inventive concept.

FIG. 2 is a block diagram of a software development platform according to an exemplary embodiment of the inventive concept.

A software development platform 5 of FIG. 2 is a program. The software development platform 5 or at least a portion thereof may be stored as a program in at least one of the RAM 12, the non-volatile memory 13, and the storage device 16 of FIG. 1, and may be executed by the processor(s) 11 to perform operations for software development. As shown in FIG. 2, the software development platform 5 may include a user interface 100 and a framework 200. Throughout the present disclosure, when operations are performed by the components of the software development platform 5, it will be assumed that the operations are performed as the components of the software development platform 5 are executed by a processor (e.g., the processor(s) 11 of FIG. 1).

The user interface 100 may process an input provided by a user and an output provided to the user. For example, the user interface 100 may process a user input received through the I/O devices 14 of FIG. 1 and transmit data to the I/O devices 14 to provide an output to the user. Hereinafter, when a user input and an output are processed by the components of the user interface 100, it will be assumed that the user input and the output are processed through I/O devices (e.g., the I/O devices 14 of FIG. 1). As shown in FIG. 2, the user interface 100 may include an MSC editor 110, a relationship editor 120, a translator or interpreter 130, and a message handler editor 140.

The MSC editor 110 may display an MSC to a user and, as at least a portion of a first input data D_IN1 is received from the user, may provide the first input data D_IN1 to the interpreter 130. The first input data D_IN1 may include information regarding a procedure designed by the user. As will be described below with reference to FIG. 3, the MSC is a chart indicating a series of messages exchanged between two or more entities and may be used for indicating procedures during software development. For example, a series of messages sent and received by actors may be represented by an MSC. Actors refer to units that may be executed in parallel in software, such as a process or a thread. A procedure may include a series of messages related to an actor, a user may design a procedure by changing an MSC provided by the MSC editor 110, and the MSC editor 110 may extract the first input data D_IN1 from a designed procedure and provide the first input data D_IN1 to the interpreter 130. Detailed descriptions of the MSC editor 110 and the first input data D_IN1 will be given below with reference to FIG. 3.

The relationship editor 120 may receive at least a portion of second data D_IN2 from the user and may provide the second input data D_IN2 to the interpreter 130. The second input data D_IN2 may include information regarding relationships between a plurality of procedures. For example, the relationship editor 120 may display a table showing relationships between the plurality of procedures, the user may define relationships between the procedures by changing the table, and the relationship editor 120 may extract the second input data D_IN2 from the changed table and provide the second input data D_IN2 to the interpreter 130. Detailed descriptions of the relationship editor 120 and the second input data D_IN2 thereof will be given below with reference to FIGS. 5A through 5C.

The interpreter 130 may generate the control data D_CTR by analyzing the first input data D_IN1 received from the MSC editor 110 and the second input data D_IN2 received from the relationship editor 120. The control data D_CTR may correspond to a portion (or a control logic) of software responsible for processing a series of messages and processing relationships between the procedures. In other words, the interpreter 130 may generate the control data D_CTR based on the first input data D_IN1 including information regarding the procedures and the second input data D_IN2 including information regarding relationships between the procedures, and may provide the control data D_CTR to the framework 200. As will be described below with reference to FIG. 4, the control data D_CTR may include a data structure that the framework 200 may use to control the procedures.

The message handler editor 140 may receive at least a portion of the function data D_FUN from the user and may provide the function data D_FUN to the framework 200. The function data D_FUN may correspond to a portion of software responsible for processing a message in a procedure, e.g., a message handler (or function logic). The message handler editor 140 may display a template for the message handler to the user based on template data D_TEM provided by the framework 200, and the user may design a message handler with reference to the template. The message handler editor 140 may provide the function data D_FUN including a message handler designed by the user to the framework 200.

As described above, the user interface 100 may provide a user separate paths for designing control logic and functional logic, and thus, the user may efficiently design software including a plurality of actors (e.g., threads) that may be executed in parallel. For the control logic, the MSC editor 110 may provide an environment for defining a procedure to the user, and the relationship editor 120 may provide an environment for defining relationships between procedures to the user.

The framework 200 may receive the control data D_CTR and the function data D_FUN from the user interface 100 and provide the template data D_TEM to the user interface 100. The template data D_TEM may be generated based on the control data D_CTR and the function data D_FUN, and may include information provided to the user through the user interface 100 to assist the user to design software. For example, the template data D_TEM may include information regarding messages and procedures defined in the control data D_CTR, and the MSC editor 110 may display a series of messages based on the template data D_TEM, and the relationship editor 120 may display names of a plurality of procedures based on the template data D_TEM. As shown in FIG. 2, the framework 200 may include a procedure control framework 210.

The procedure control framework 210 may control procedures by processing a series of messages based on the control data D_CTR. For example, the control data D_CTR may include information regarding types of messages and, when one actor receives a message, the procedure control framework 210 may trigger a procedure, abort a procedure, or continue execution of a procedure. Furthermore, the procedure control framework 210 may process a triggered new procedure and a procedure being performed based on information regarding relationships between the procedures included in the control data D_CTR. Additionally, the procedure control framework 210 may process an operation that an actor performs in response to a received message, based on a message handler defined by the function data D_FUN. Therefore, the procedure control framework 210 may provide the user an efficient framework for software development that includes a plurality of actors, by accurately controlling a series of messages and a plurality of procedures based on the control data D_CTR. Detailed descriptions of the procedure control framework 210 will be given below with reference to FIG. 6.

Figure 3:
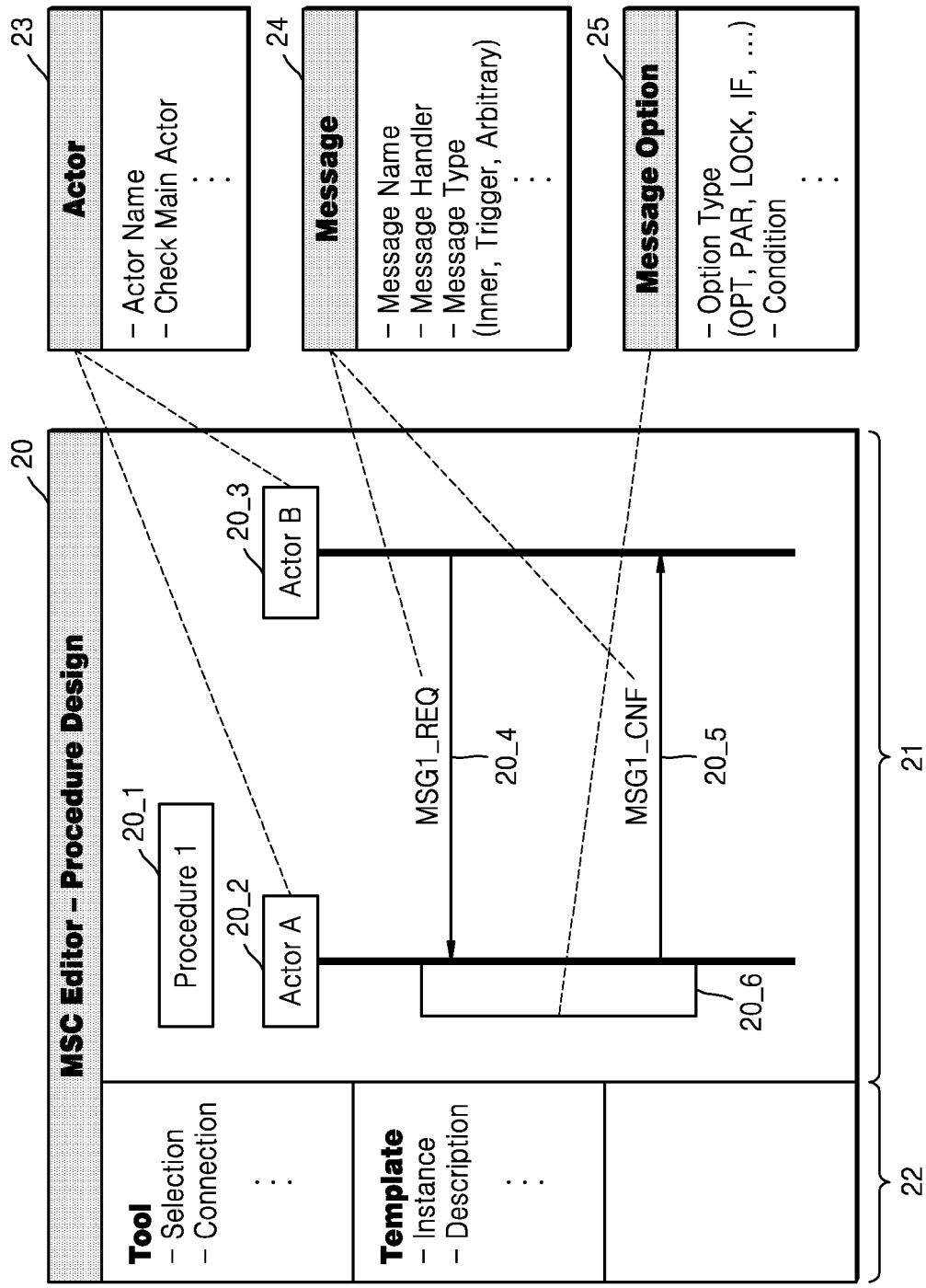
FIG. 3 is a diagram showing a display provided by a message sequence chart (MSC) editor of FIG. 2, according to an exemplary embodiment of the inventive concept.

FIG. 3 is a diagram showing a display provided by an MSC editor of FIG. 2, according to an exemplary embodiment of the inventive concept. As described above with reference to FIG. 2, the MSC editor 110 may display an MSC to the user and extract the first input data D_IN1 from the changed MSC according to a user input. Hereinafter, a description of FIG. 3 will be given with reference to FIG. 2.

Referring to FIG. 3, a procedure design region 20 may include an MSC region 21 and a search region 22. The MSC region 21 is a space in which a user defines a procedure. As shown in FIG. 3, the MSC region 21 may display a name 20_1 of a procedure (e.g., "Procedure_1") that may be edited by the user, actors 20_2 and 20_3 (e.g., "Actor A" and "Actor B"), messages 20_4 and 20_5 (e.g., "MSG1_REQ" and "MSG1_CNF"), and a message option 20_6. The search region 22 may provide tools for the user to edit an MSC and may also provide templates (e.g., templates based on the template data D_TEM of FIG. 2). Although two actors 20_2 and 20_3 and two messages 20_4 and 20_5 are shown in the MSC region 21 of FIG. 3, the inventive concept is not limited thereto.

The first input data D_IN1 extracted by the MSC editor 110 may include information regarding an actor. For example, as shown in FIG. 3, the MSC editor 110 may provide an actor editing region 23, so that a user may enter information regarding an actor, such as the name of the actor or information indicating whether the actor is a main actor that is started simultaneously as a procedure is initiated.

The first input data D_IN1 extracted by the MSC editor 110 may include information regarding a message. For example, as shown in FIG. 3, the MSC editor 110 may provide a message editing region 24, and a user may enter information regarding a message, such as the name of the message, an identifier of a message handler, and a type of the message, in the message editing region 24. A message handler performs an operation for processing a message in a procedure. A message handler may be defined in the function data D_FUN of FIG. 2, and a user may specify an identifier of the message handler (e.g., a name, a path, etc.) to link a corresponding message to the message handler.

Messages may be classified into different types, e.g., a procedure trigger message, a procedure internal message, or an arbitrary message. A procedure trigger message is a first message transmitted to and received from an MSC, and may trigger a new procedure. An arbitrary message may be generated at any time point while a procedure is being performed, e.g., a timer expiry message. A procedure internal message is a message other than a procedure trigger message and an arbitrary message, and may be processed while a corresponding procedure is being performed. As will be described below with reference to FIG. 6, the procedure control framework 210 of FIG. 2 may control a procedure according to the types of messages.

The first input data D_IN1 extracted by the MSC editor 110 may include information regarding a message option (or a message generation option). For example, as shown in FIG. 3, the MSC editor 110 may provide a message option edit region 25, and a user may enter a message option in the message option edit region 25. For example, the user may enter options similar to message options suggested in the MSC specification, such as OPT, PAR, IF/ELSE, ALT, LOOP, etc., in the message option edit region 25. Furthermore, the message option edit region 25 and the framework 200 of FIG. 2 may support LOCK as a message option. The LOCK option may be used to assign priorities to portions (or nodes) of a procedure to be processed prior to any other procedure and may be appropriate when multiple procedures are performed concurrently.

Figure 4:
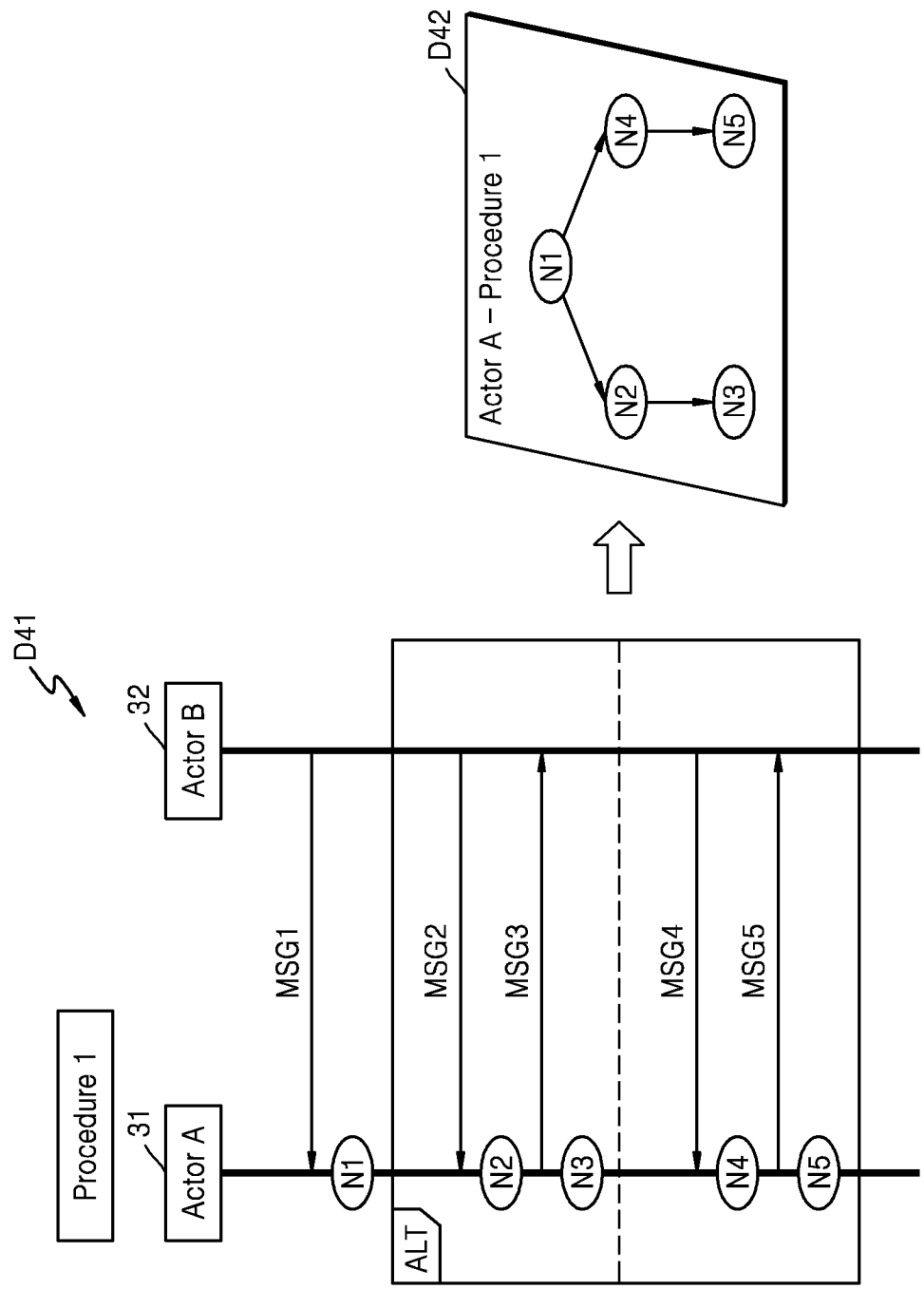
FIG. 4 is a diagram showing control data generated by an interpreter of FIG. 2, according to an exemplary embodiment of the inventive concept.

FIG. 4 is a diagram showing control data generated by an interpreter of FIG. 2, according to an exemplary embodiment of the inventive concept. For example, the left portion of FIG. 4 shows an MSC D41 defining a first procedure (e.g., "Procedure 1") of an Actor A 31, and the right portion of FIG. 4 shows a portion D42 of the control data D_CTR generated from the MSC D41. As described above with reference to FIG. 2, the interpreter 130 may generate the control data D_CTR having a format that may be processed by the framework 200 by interpreting the first and second input data D_IN1 and D_IN2. Hereinafter, a description of FIG. 4 will be given with reference to FIGS. 2 and 3.

Referring to the left portion of FIG. 4, the MSC D41 may define a series of messages MSG1 through MSG5 between the two actors 31 and 32 (e.g., "Actor A" and "Actor B"). The first message MSG1 is a trigger message and, when the Actor A 31 receives the trigger message, the Actor A 31 may initiate a first procedure that defines the series of messages MSG1 through MGS5. As shown in the MSC D41, the first procedure of the Actor A 31 may be separated into parts N1 through N5 that perform operations for processing the messages MSG1 through MSG5, respectively. For example, an operation for processing the first message MSG1 may be performed by 'N1', and an operation for transmitting the third message MSG3 in response to the second message MSG2 may be performed by 'N2'.

As shown in FIG. 4, 'ALT' may be defined in the MSC D41 as a message option, and the first procedure may perform different operations according to messages received by 'N1'. In other words, when the Actor A 31 receives the second message MSG2 at 'N1', the second message MSG2 is processed by 'N2' to transmit the third message MSG3, and 'N3' may perform a subsequent operation. On the other hand, when the Actor A 31 receives the fourth message MSG4 at 'N1', the fourth message MSG4 is processed by 'N4' to transmit the fifth message MSG5, and 'N5' may perform a subsequent operation. Each of the parts N1 through N5 of the first procedure may be defined by the function data D_FUN.

The interpreter 130 of FIG. 2 may generate data having a tree structure from the first data D_IN1. For example, in the MSC D41, the first procedure may include the parts N1 through N5 that process the messages MSG1 through MSG5, respectively, and, in the portion D42 of the control data D_CTR, the first procedure may be represented by a tree structure arranged in the order in which the parts N1 through N5 are performed. In other words, nodes of a tree may correspond to the parts N1 through N5 of the first procedure that process messages, and the parts N1 through N5 of the first procedure correspond to the messages MSG1 through MSG5, respectively. Thus, the nodes of the tree may correspond to the messages MSG1 through MSG5. Hereinafter, an operation unit (e.g., N1) for processing a message in a procedure may be referred to as a node. The framework 200 may control the first procedure by sequentially tracking nodes and processing messages based on the control data D_CTR including the portion D42 having the tree structure.

Figures 5A, 5B:
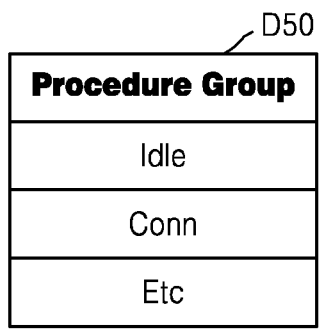
FIGS. 5A through 5C are diagrams showing second input data of FIG. 2, according to an exemplary embodiment of the inventive concept.
Figure 5C:
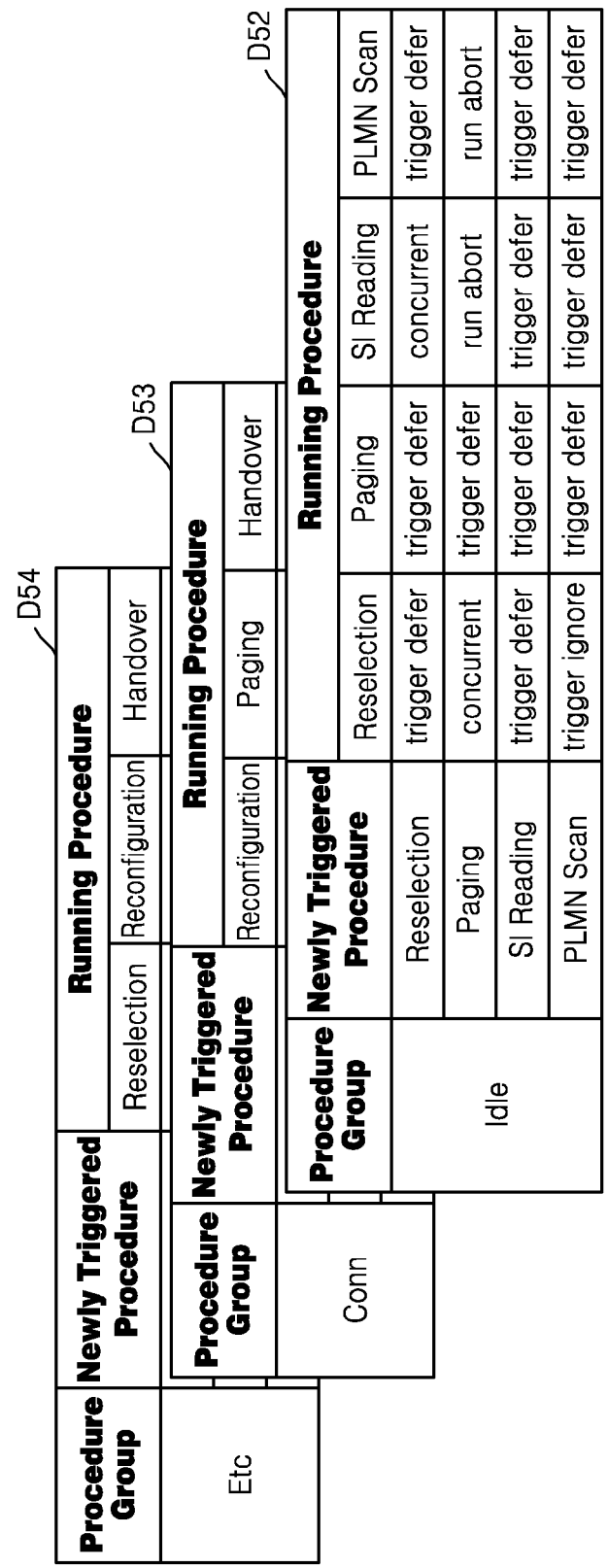

FIGS. 5A through 5C are diagrams showing second input data of FIG. 2 according to an exemplary embodiment of the inventive concept. As described above with reference to FIG. 2, the second input data D_IN2 may be data including information regarding relationships between a plurality of procedures. As shown in FIGS. 5A through 5C, the relationship editor 120 of FIG. 2 may display tables D50 through D54 showing relationships between the plurality of procedures, and a user may define relationships between the plurality of procedures by changing the tables D50 through D54.

Referring to FIG. 5A, procedures performed by an actor may be grouped into procedure groups according to their attributes. For example, as shown in FIG. 5A, when a device on which software is executed is a communication device, there may be procedure groups according to states of the communication device, such as 'Idle' indicating a standby state, 'Conn' indicating a state in which the communication device is capable of communicating with another communication device, and 'Etc' indicating other states. Each of the procedure groups may include procedures that an actor may perform in the corresponding state of the communication device as represented by the procedure group. The relationship editor 120 may display the table D50 representing procedure groups, and a user may edit (e.g., delete, add, or change) the procedure groups by changing the table D50.

Referring to FIG. 5B, procedures included in each of the procedure groups may be defined. For example, as shown in FIG. 5B, an actor may perform six procedures (e.g., Reselection, Reconfiguration, Paging, SI Reading, PLMN Scan, and Handover) and each of the six procedures may be included in at least one of the three procedure groups (e.g., 'Idle', 'Conn', 'Etc'). For example, the procedure 'Reselection' may be included in two of the procedure groups (e.g., 'Idle' and 'Etc'). The relationship editor 120 may display the table D51 representing the procedures and procedure groups, and a user may define relationships between the procedures and the procedure groups by changing the table D51.

Referring to FIG. 5C, relationships between procedures in one procedure group may be defined. For example, as shown in the table D52 of FIG. 5C, in the procedure group 'Idle', four procedures (e.g., 'Reselection', 'Paging', 'SI Reading', and 'PLMN Scan') may be defined. A relationship between two procedures may refer to information regarding performance of two procedures when one procedure is triggered while another procedure is being performed. Therefore, the tables D52, D53, and D54, shown in FIG. 5C and corresponding to 'Idle', 'Conn', and 'Etc', respectively, may be referred to as conflict matrices.

As shown in FIG. 5C, a relationship between two procedures may be one of four options. In other words, a relationship between the two procedures may indicate that a triggered procedure is performed concurrently with a procedure being performed (e.g., 'concurrent' in FIG. 5C), the triggered procedure is performed after the procedure being performed is aborted (e.g., 'run abort' in FIG. 5C), performance of the triggered procedure is deferred until the procedure being performed is terminated (e.g., 'trigger defer' in FIG. 5C), or the triggered procedure is ignored by the procedure being performed (e.g., 'trigger ignore' in FIG. 5C). For example, as shown in the table D52, the procedure 'Reselection' may be performed concurrently while the procedure 'SI Reading' is being performed. Additionally, while the procedure ' SI Reading' is being performed, if the procedure 'Paging' is triggered, the procedure 'SI Reading' may be aborted.

Figure 6:
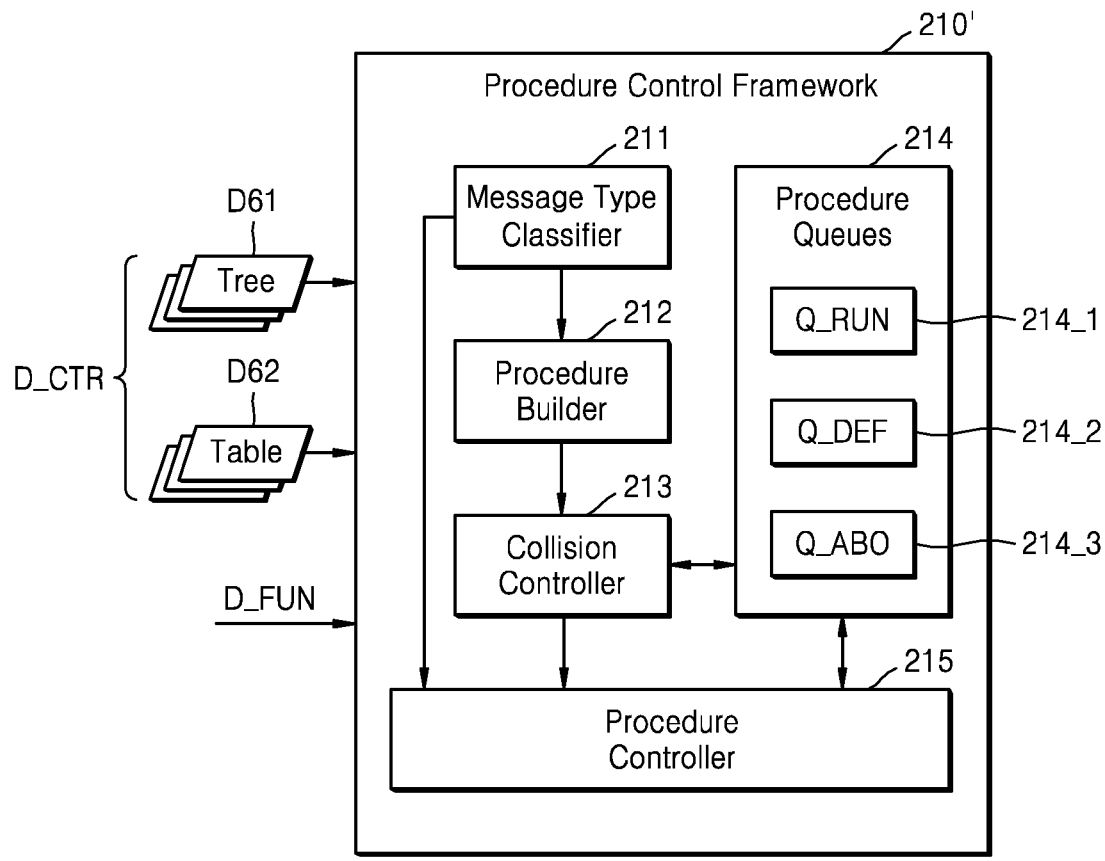
FIG. 6 is a block diagram showing a procedure control framework of FIG. 2, according to an exemplary embodiment of the inventive concept.

FIG. 6 is a block diagram showing a procedure control framework of FIG. 2 according to an exemplary embodiment of the inventive concept. A procedure control framework 210' of FIG. 6 may correspond to the procedure control framework 210 of FIG. 2. As described above with reference to FIG. 2, the procedure control framework 210' may receive the control data D_CTR and the function data D_FUN, and may control procedures based on the control data D_CTR and the function data D_FUN. As shown in FIG. 6, the control data D_CTR received by the procedure control framework 210' includes data D61 having a tree structure generated from the first input data D_IN1 of FIG. 2 and data D62 including a table generated from the second input data D_IN2 of FIG. 2.

Referring to FIG. 6, the procedure framework 210' may include a message type classifier 211, a procedure constructor or procedure builder 212, a conflict/collision controller 213, procedure queues 214, and a procedure controller 215. The message type classifier 211 may forward a message to the procedure builder 212 or the procedure controller 215 according to the type of the message. For example, the message type classifier 211 may forward a procedure trigger message to the procedure builder 212 and forward a procedure internal message or an arbitrary message to the procedure controller 215.

The procedure builder 212 may generate a new procedure (or a procedure handler) in response to a message received from the message type classifier 211, e.g., a procedure trigger message. For example, based on the data D61 having a tree structure, the procedure builder 212 may obtain information regarding a procedure trigger message and generate a procedure (or a procedure handler) based on the obtained information.

The collision controller 213 may provide information to the procedure controller 215 regarding relationships between a procedure generated by the procedure builder 212 and procedures being performed. For example, the procedures being performed may refer to procedures (or procedure handlers) in a run queue 214_1 included in the procedure queues 214, and the collision controller 213 may access the run queue 214_1 and refer to the data D62, which includes a table indicating information regarding relationships between the procedures. The collision controller 213 may provide, to the procedure controller 215, a procedure trigger message, a generated procedure, and information regarding relationships between the procedures.

The procedure controller 215 may control procedures by processing a message received from the message type classifier 211 and a message received from the collision controller 213. As shown in FIG. 6, the procedure controller 215 may access the procedure queues 214, and the procedure queues 214 may include the run queue 214_1 including procedures currently being performed, a defer queue 214_2 including procedures to be performed at the time of termination of a procedure currently being performed, and an abort queue 214_3 including procedures to be aborted. The procedure controller 215 may control a procedure by retrieving the procedure from the queues included in the procedure queues 214 or by inserting the procedure into the queues. Detailed description of the operation of the procedure controller 215 will be given below with reference to FIGS. 8A through 8C.

Figure 7:
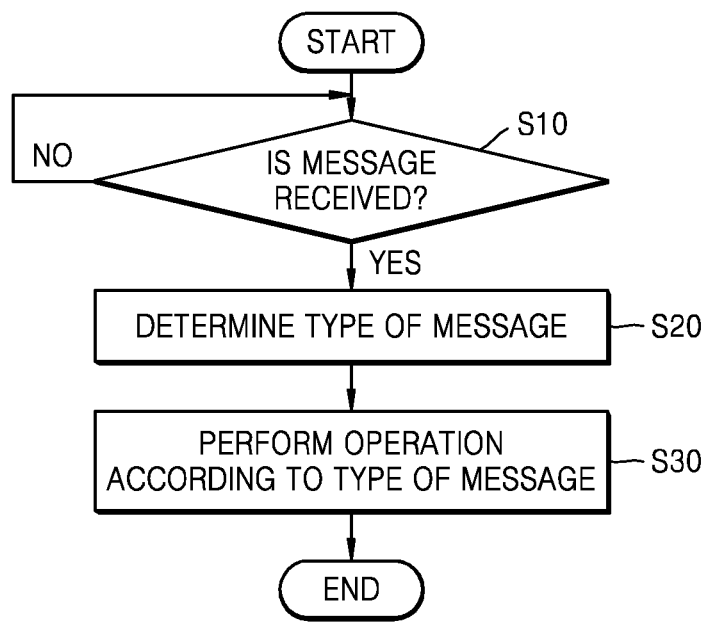
FIG. 7 is a flowchart showing operations of the procedure control framework of FIG. 2, according to an exemplary embodiment of the inventive concept.

FIG. 7 is a flowchart showing operations of the procedure control framework of FIG. 2 according to an exemplary embodiment of the inventive concept. For example, the operations shown in FIG. 7 may be performed by the procedure control framework 210' of FIG. 6, which is an example of the control framework 210 of FIG. 2, and thus a description of FIG. 7 will be given with reference to FIG. 6.

Referring to FIG. 7, an operation for determining whether a message is received may be performed in operation S10 and, when a message is received (S10: YES), an operation for determining a message type may be performed in operation S20. When a message is not received (S10: NO), operation S10 may continue to be performed. For example, the message type classifier 211 may determine whether a message is received, may wait for a message to be received when no message is received, and may determine a message type when a message is received.

In operation S30, an operation may be performed according to the message type. For example, the message type classifier 211 may forward a message to the procedure builder 212 when the type of the message is a procedure trigger message for triggering a new procedure. When the type of the message is a type other than the procedure trigger message, the message type classifier 211 may forward the message to the procedure controller 215. Detailed description of operation S30 will be given below with reference to FIGS. 8A through 8C.

Figure 8A:
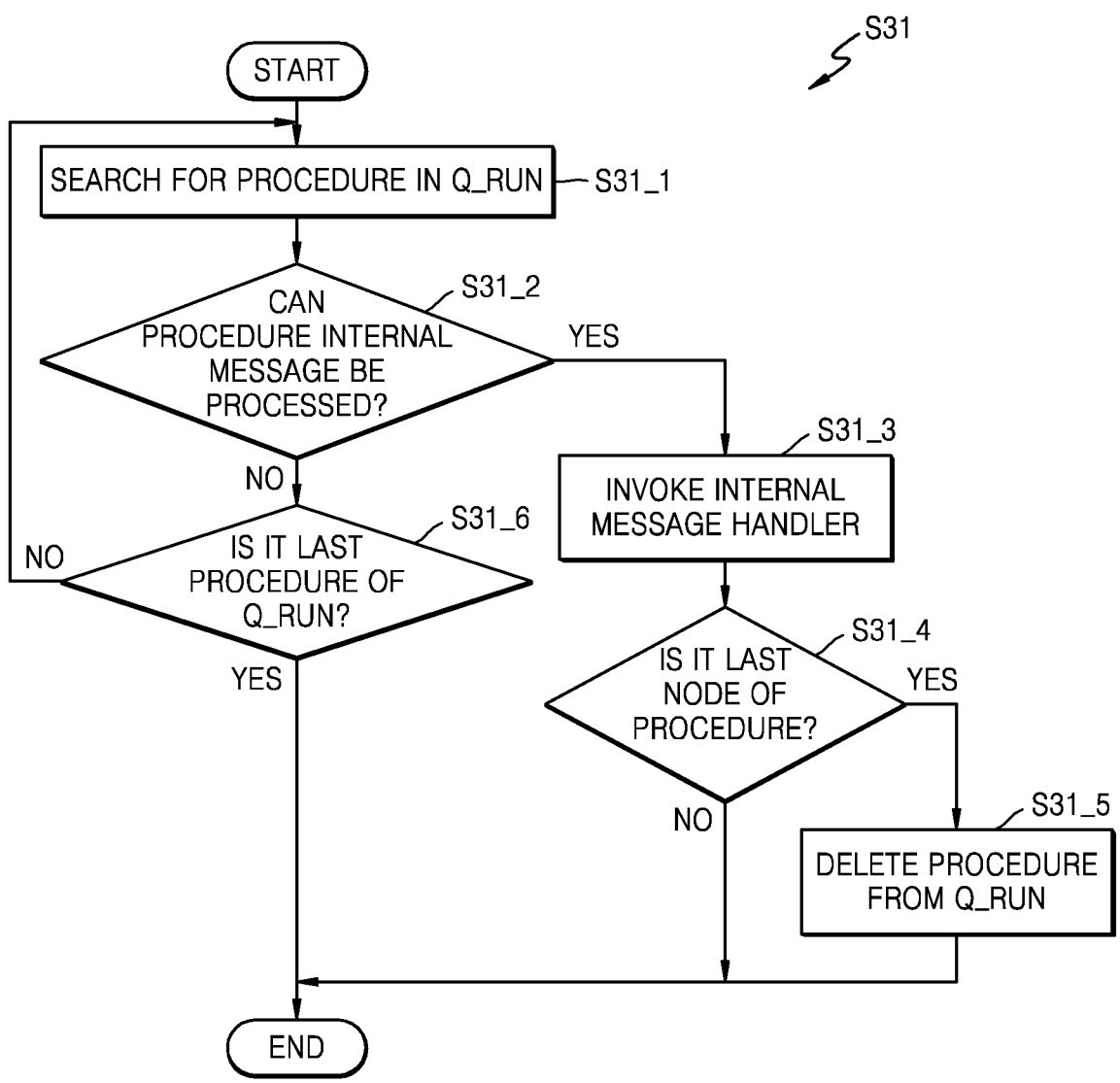
FIGS. 8A through 8C are flowcharts showing operations performed according to message type according to exemplary embodiments of the inventive concept.
Figure 8B:
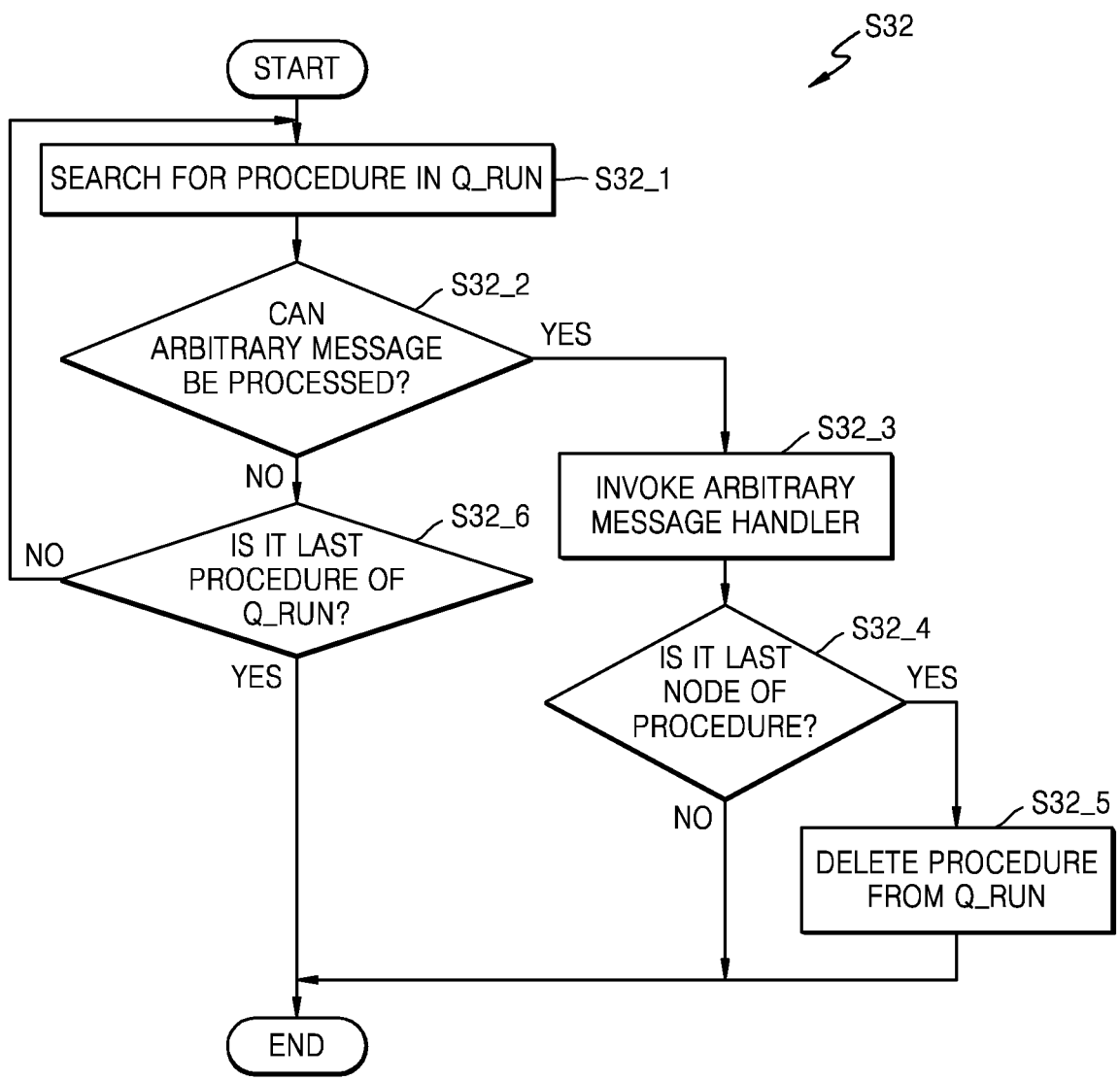
Figure 8C:
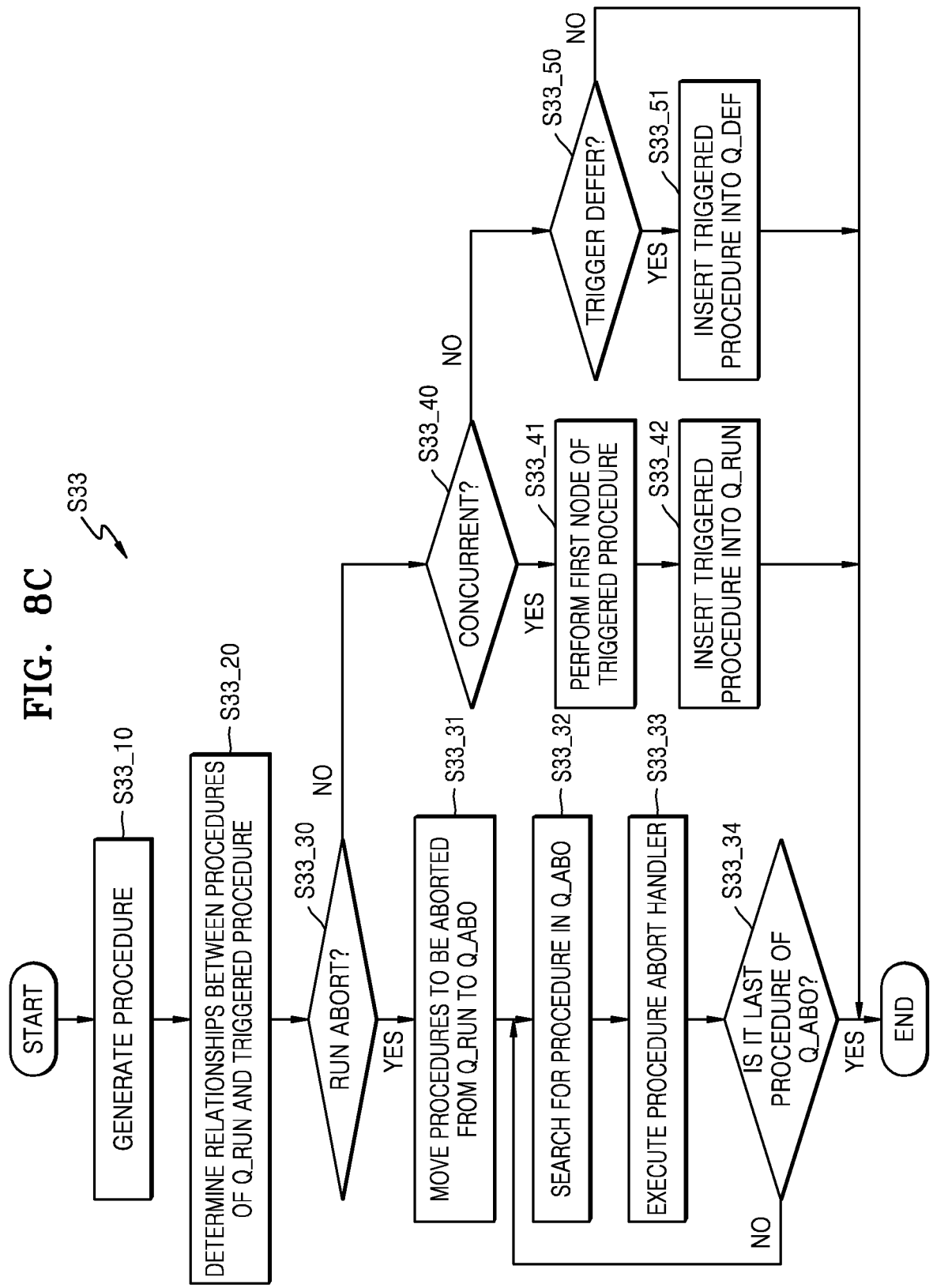

FIGS. 8A through 8C are flowcharts showing operations performed according to message type according to exemplary embodiments of the inventive concept. Operations S31, S32, and S33 of FIGS. 8A, 8B, and 8C, respectively, correspond to operation S30 of FIG. 7. For example, the flowchart of FIG. 8A shows operation S31 in a case where the type of a message is a procedure internal message, the flowchart of FIG. 8B shows operation S32 in a case where the type of a message is an arbitrary message, and FIG. 8C shows operation S33 in a case where the type of a message is a procedure trigger message. The operations shown in FIGS. 8A through 8C may be performed by the procedure control framework 210' of FIG. 6 and, hereinafter, descriptions of FIGS. 8A through 8C will be given with reference to FIG. 6.

Referring to FIG. 8A, when the type of a message is a procedure internal message, an operation of searching for a procedure existing in the run queue 214_1 is performed in operation S31_1. For example, the procedure controller 215 may retrieve one of procedures (or procedure handlers) in the run queue 214_1 by accessing the run queue 214_1.

In operation S31_2, it is determined whether the procedure internal message can be processed by the retrieved procedure. For example, the control data D_CTR generated based on a MSC or the like may include information regarding a procedure defining a series of messages, and it may be determined whether the procedure internal message can be processed by a currently performing node of the retrieved procedure. When the retrieved procedure is capable of processing the procedure internal message (S31_2: YES), an operation for processing the procedure internal message may be performed subsequently according to procedures in operations S31_3 through S31_5. If not (S31_2: NO), operation S31_6 may be performed subsequently.

In operation S31_3, an operation for invoking an internal message handler may be performed. For example, when a current node of a procedure is defined by the function data D_FUN, e.g., when a message handler corresponding to the current node is defined, the procedure controller 215 may process the procedure internal message according to the message handler and proceed to a next node of the procedure.

In operation S31_4, it is determined whether the last node of the retrieved procedure has been reached. When the procedure has reached the last node (S31_4: YES), in operation S31_5, an operation for deleting the procedure from the run queue 214_1 may be performed. In other words, the procedure may be terminated.

In operation S31_6, it is determined whether the retrieved procedure is the last procedure of the run queue 214_1. When the retrieved procedure is not the last procedure of the run queue 214_1 (S31_6: NO), e.g., there may still be a procedure in the run queue 214_1 that is capable of processing the procedure internal message, operation S31_1 may be performed again to search for a next procedure in the run queue 214_1. On the other hand, when the retrieved procedure is the last procedure of the run queue 214_1 (S31_6: YES), e.g., when it is determined that it is impossible to process the procedure internal message with respect to all of the procedures in the run queue 214_1, the operation S31 for processing the procedure internal message may be terminated. If it is determined that the procedure internal message cannot be processed by any of the procedures in the run queue 214_1, the procedure internal message may be processed by the procedure control framework 210' as an arbitrary message, which will be described below with reference to FIG. 8B.

Referring to FIG. 8B, when the type of a message is an arbitrary message, an operation for searching for a procedure in the run queue 214_1 may be performed in operation S32_1, and then it is determined whether the arbitrary message can be processed by a retrieved procedure in operation S32_2. When the arbitrary message can be processed by the retrieved procedure (S32_2: YES), an operation for processing the arbitrary message according to an arbitrary message handler may be performed subsequently in operations S32_3 through operation S32_5. Otherwise (S32_2: NO), operation S32_6 may be performed subsequently.

In operation S32_3, an operation for invoking the arbitrary message handler may be performed. For example, the procedure controller 215 may invoke and control the arbitrary message handler to process the arbitrary message.

In operation S32_4, it is determined whether the last node of the retrieved procedure has been reached. When the procedure has reached the last node (S32_4: YES), in operation S32_5, an operation for deleting the procedure from the run queue 214_1 may be performed. In other words, the procedure may be terminated.

In operation S32_6, it is determined whether the retrieved procedure is the last procedure of the run queue 214_1. When the retrieved procedure is not the last procedure of the run queue 214_1 (S32_6: NO), operation S32_1 may be performed again. On the other hand, when the retrieved procedure is the last procedure of the run queue 214_1 (S32_6: YES), operation S32 for processing the arbitrary message may be terminated. An arbitrary message which was not be processed by any of procedures currently being performed (e.g., in the run queue 214_1) may be considered as an error by a control framework (e.g., an error handler may be invoked).

Referring to FIG. 8C, when the type of a message is a procedure trigger message, an operation for generating a procedure may be performed in operation S33_10. For example, the procedure builder 212 may generate a procedure (or a procedure handler) based on the control data D_CTR according to the procedure trigger message.

In operation S33_20, an operation for determining relationships between procedures of the run queue 214_1 and a triggered procedure may be performed. For example, the collision controller 213 may check relationships between the procedures of the run queue 214_1 and the triggered procedure by referring to the control data D_CTR and accessing the run queue 214_1, and may forward information regarding the checked relationships to the procedure controller 215.

Depending on the relationships between the procedures of the run queue 214_1 and the triggered procedure, different operations may be performed in operations S33_30, S33_40, and S33_50. For example, when the triggered procedure is performed after a procedure being performed is aborted (S33_30: YES), operations S33_31 through S33_34 may be performed. When the triggered procedure may be performed concurrently with the procedure being performed (S33_40: YES), operations S33_41 and S33_42 may be performed. When the triggered procedure is performed after being deferred until termination of the procedure being performed (S33_50: YES), operation S33_51 may be performed. When the triggered procedure is ignored, operation S33 for processing the procedure trigger message may be terminated.

When the triggered procedure is performed after the procedure being performed is aborted (S33_30: YES), an operation for moving procedures (or procedure handlers) to be aborted from the run queue 214_1 to the abort queue 214_3 may be performed in operation S33_31. For example, the procedure controller 215 may move procedures to be aborted by the triggered procedure from the run queue 214_1 to the abort queue 214_3.

In operation S33_32, an operation for searching for a procedure in the abort queue 214_3 may be performed, and then an operation for executing a procedure abort handler may be performed in operation S33_33. For example, the procedure controller 215 may invoke a procedure abort handler corresponding to the procedure retrieved from the abort queue 214_3.

In operation S33_34, it is determined whether the retrieved procedure is the last procedure of the abort queue 214_3. When the retrieved procedure is not the last procedure of the abort queue 214_3 (S33_34: NO), e.g., when a procedure for which a corresponding abort handler has not been executed exists in the abort queue 214_3, operation S33_32 may be performed again. On the other hand, when the retrieved procedure is the last procedure of the abort queue 214_3 (S33_34: YES), e.g., when an abort handler is executed for all procedures in the abort queue 214_3, operation S33 for processing the procedure trigger message may be terminated.

When the triggered procedure is performed concurrently with the procedure being performed (S33_40: YES), a first node of the triggered procedure may be performed in operation S33_40. For example, when a current node of a procedure is defined by the function data D_FUN, e.g., when a message handler corresponding to the current node is defined, the procedure controller 215 may process the procedure trigger message according to the message handler and proceed to a next node.

In operation S33_42, an operation for inserting the triggered procedure into the run queue 214_1 may be performed. For example, the procedure controller 215 may insert the triggered procedure (or a procedure handler) into the run queue 214_1, and the triggered procedure may then become one of procedures being performed.

When the triggered procedure is performed after being deferred until the termination of the procedure being performed (S33_50: YES), an operation for inserting the triggered procedure into the defer queue 214_2 may be performed in operation S33_51. For example, the procedure controller 215 may insert the triggered procedure into the defer queue 214_2 and search for a procedure in the deferred queue 412_3 when a procedure being performed is terminated. Afterwards, the procedure controller 215 may check again whether a retrieved procedure can be currently performed (e.g., operations S33_30, S33_40, and S33_50), and the procedure controller 215 may perform a first node of the retrieved procedure and insert the retrieved procedure into the run queue 214_1 when it is determined that the retrieved procedure can be currently performed.

Figure 9:
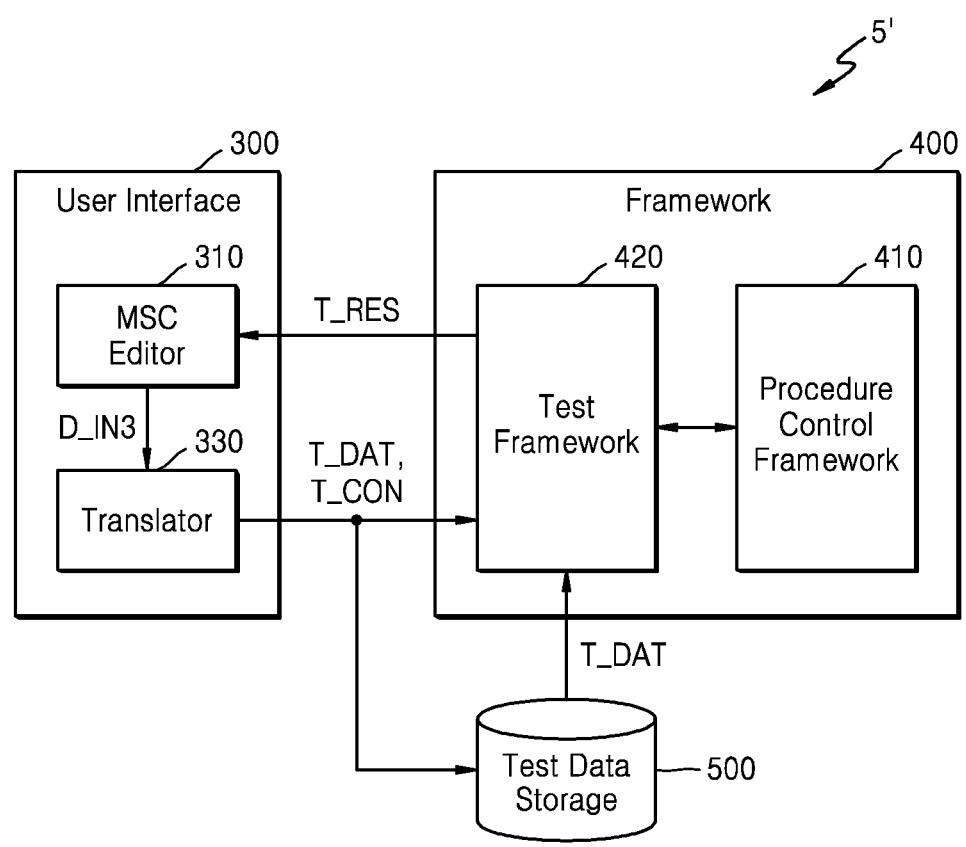
FIG. 9 is a block diagram showing a software development platform according to an exemplary embodiment of the inventive concept.

FIG. 9 is a block diagram showing a software development platform according to an exemplary embodiment of the inventive concept. Similar to the software development platform 5 of FIG. 2, a software development platform 5' of FIG. 9 is a program. The software development platform 5' or at least a portion thereof may be stored in at least one of the RAM 12, the non-volatile memory 13, and the storage device 16 of FIG. 1, and may be executed by the processor(s) 11 to perform operations for software development. Compared to the software development platform 5 of FIG. 2, a framework 400 of the software development platform 5' of FIG. 9 may further include a test framework 420 to provide a framework for testing software to a user. Hereinafter, descriptions of FIG. 9 identical to the descriptions given above with reference to FIG. 2 will be omitted.

As shown in FIG. 9, a user interface 300 may include an MSC editor 310 and a translator or interpreter 330 and may further include a relationship editor and a message handler editor. The MSC editor 310 may display an MSC indicating a test case as will be described below with reference to FIG. 10 or may display an MSC indicating a result of executing a test case as will be described below with reference to FIG. 13. A user may easily define a test case by changing an MSC and may easily check a test result through an MSC indicating a result of executing a test case. Furthermore, the MSC editor 310 may display a test flow, and a user may easily control the test flow by changing the MSC.

As shown in FIG. 9, the MSC editor 310 may extract third input data D_IN3 from an MSC and provide the third input data D_IN3 to the interpreter 330. The third input data D_IN3 may include information regarding a test case, e.g., information regarding an actor, a procedure, a message, etc., and may include information regarding control of a test flow. Furthermore, as shown in FIG. 9, the MSC editor 310 may receive test result data T_RES from the framework 400 and display the test result data T_RES along with an MSC.

The interpreter 330 may generate the test data T_DAT and test configuration data T_CON by interpreting the third input data D_IN3, and provide the test data T_DAT and the test configuration data T_CON to the framework 400. The test data T_DAT may include information regarding a test case, and the test configuration data T_CON may include information input by a user for controlling a test flow. As shown in FIG. 9, the test data T_DAT may be stored in a test data store 500 and the test data T_DAT stored in the test data store 500 may be provided to the framework 400.

The framework 400 may include a procedure control framework 410 and the test framework 420. The test framework 420 may receive the test data T_DAT and the test configuration data T_CON, may provide the test result data T_RES to the user interface 300, and may provide a framework for testing software designed by a user. Detailed description of the test framework 420 will be given below with reference to FIG. 12.

Figure 10:
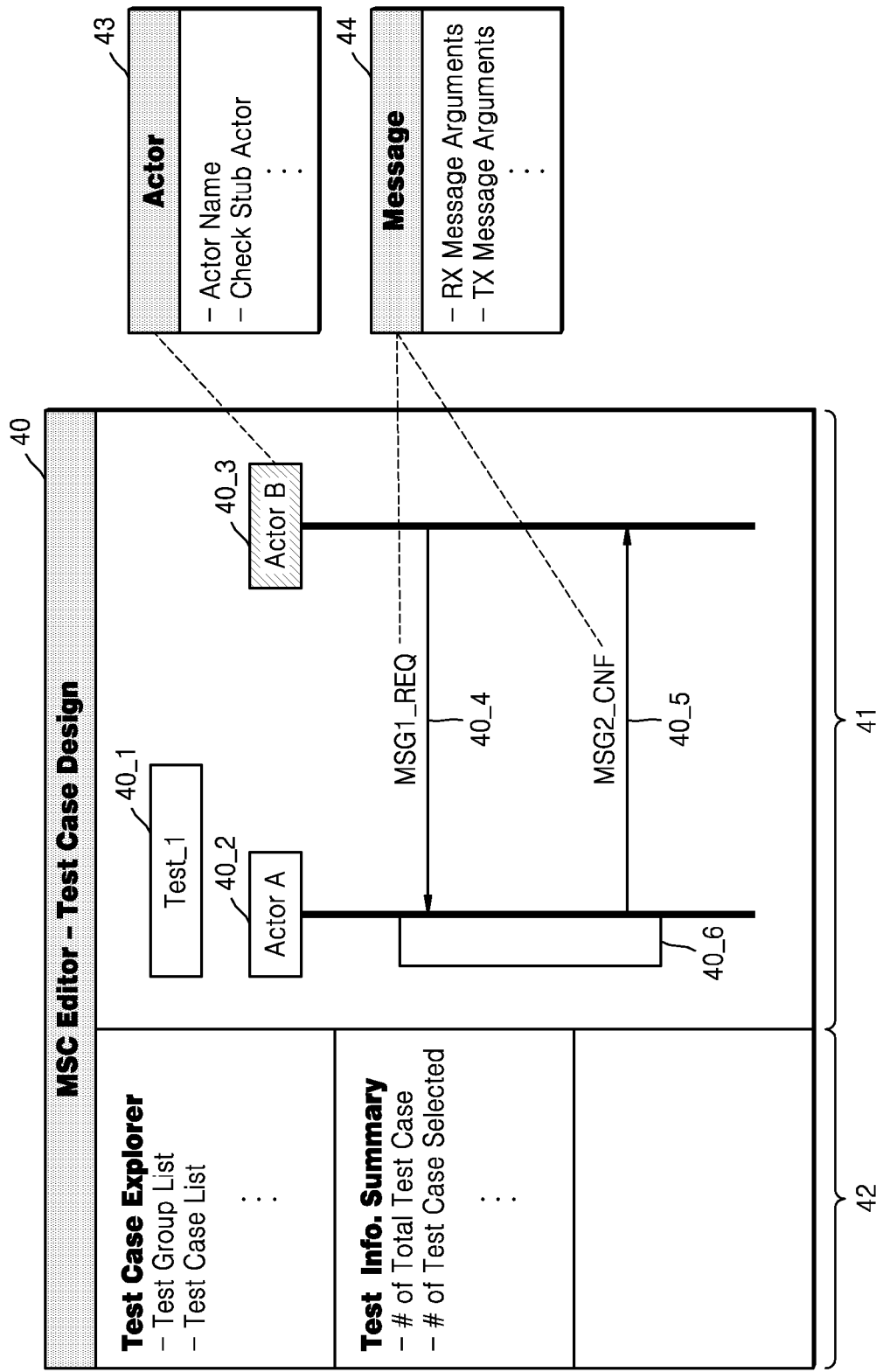
FIG. 10 is a diagram showing a display provided by an MSC editor of FIG. 9, according to an exemplary embodiment of the inventive concept.

FIG. 10 is a diagram showing a display provided by an MSC editor of FIG. 9 according to an exemplary embodiment of the inventive concept. As described above with reference to FIG. 9, the MSC editor 310 may display an MSC to a user, receive information regarding a test case, and extract the third input data D_IN3 including information regarding the test case from the MSC changed based on a user input. Hereinafter, a description of FIG. 10 will be given with reference to FIG. 9.

Referring to FIG. 10, a test case design region 40 may include an MSC region 41 and a search region 42. The MSC region 41 is a space for a user to define a test case. As shown in FIG. 10, the MSC region 41 may display a name 40_1 (e.g., "Test_1"), a plurality of actors 40_2 and 40_3 (e.g., "Actor A" and "Actor B"), messages 40_4 and 40_5 (e.g., "MSG1_REQ" and "MSG2_CNF"), and a message option 40_6. The search region 42 may provide a tool for searching for test cases and may provide summary information regarding the test cases.

The third input data D_IN3 extracted by the MSC editor 310 may include information regarding actors. For example, as shown in FIG. 10, the MSC editor 310 may provide an actor editing region 43, and a user may enter information regarding an actor, e.g., the name of the actor and information indicating whether the actor is a stub actor, in the actor editing region 43. A stub actor (or a mock actor) may refer to an actor that transmits and receives messages to and from an actor to be tested, and the test framework 420 may automatically generate a stub actor based on a user-defined MSC, e.g., a test case. For example, in FIG. 10, when an Actor B 40_3 is a stub actor and the message 40_4 is received, the test framework 420 may automatically generate a code for transmitting the message 40_5 according to the message 40_4.

The third input data D_IN3 extracted by the MSC editor 310 may include information regarding a message. For example, as shown in FIG. 10, the MSC editor 310 may provide a message editing region 44, and a user may enter information regarding message parameters in the message editing region 44. In other words, when an Actor A 40_2 is an actor to be tested, a user may input values of parameters of the message 40_4 as values of parameters of a received message and input values of parameters of the message 40_5 as values of parameters of a message to be transmitted. To test Actor A 40_2, all of the values of the parameters of the received message may be input, whereas only the values of the parameters of the transmitted message that need to be verified may be input. According to an exemplary embodiment of the inventive concept, from among the values of the parameters of the received message, values that are not entered by a user may have default values.

Figure 11:
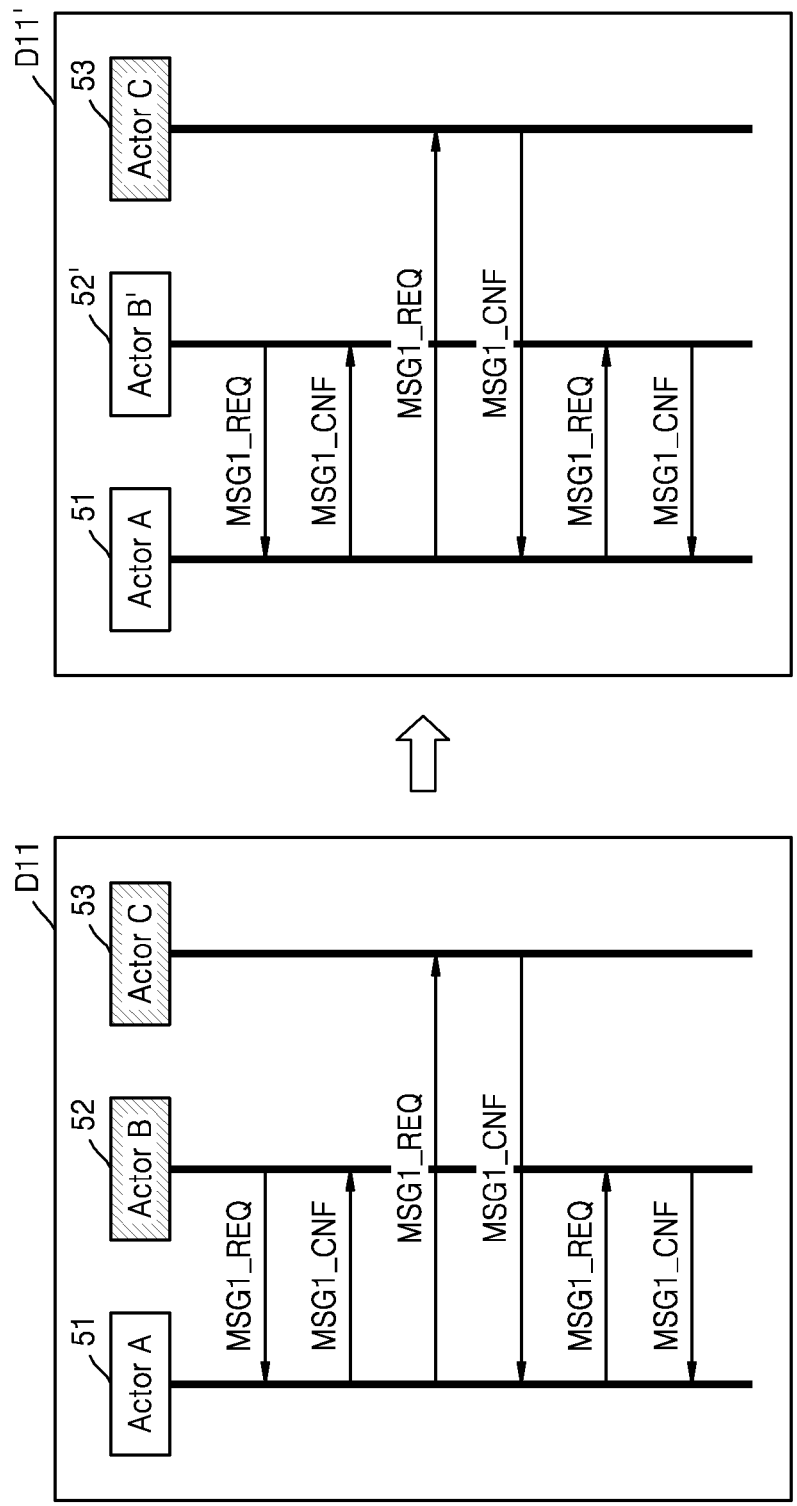
FIG. 11 is a diagram showing MSCs defining a test case, according to an exemplary embodiment of the inventive concept.

FIG. 11 is a diagram showing MSCs defining a test case according to an exemplary embodiment of the inventive concept. As described above with reference to FIG. 10, an MSC defining a test case may include an actor to be tested and a stub actor. As shown in FIG. 11, the MSC may be defined to include two or more actors. According to an exemplary embodiment of the inventive concept, the MSC may include two or more actors to be tested as well as two or more stub actors. For example, as shown in the left portion of FIG. 11, an MSC D11 may include an Actor A 51 to be tested and two stub actors 52 and 53. Furthermore, as shown in the right portion of FIG. 11, an MSC D11' may include two actors 51 and 52' to be tested and the stub actor 53. Testing an actor as in the MSC D11 of FIG. 11 may be referred to as a unit test, and testing two or more actors as in the MSC D11' of FIG. 11 may be referred to as an integration test.

A stub actor may be changed by a user to an actor to be tested. For example, a user may use the MSC editor 310 of FIG. 9 to replace the Actor B 52, which is a stub actor, to an Actor B' 52' that is implemented (e.g., having the function data D_FUN defined by a user), thus designing the MSC D11'. Therefore, the Actor A 51 and the Actor B' 52' may be tested and, in this regard, software including a plurality of actors may be gradually tested.

Figure 12:
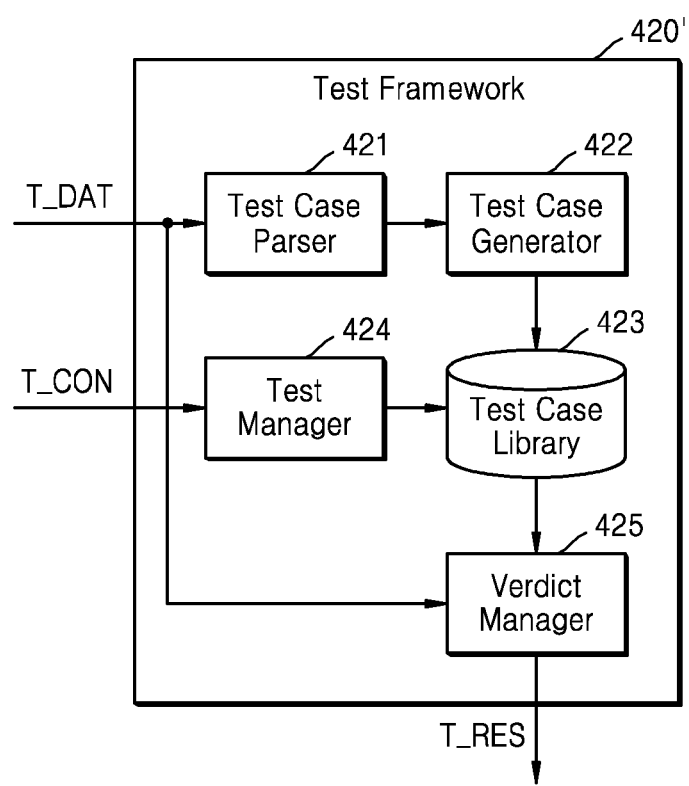
FIG. 12 is a block diagram showing a test framework of FIG. 9, according to an exemplary embodiment of the inventive concept.

FIG. 12 is a block diagram showing a test framework of FIG. 9 according to an exemplary embodiment of the inventive concept. A test framework 420' of FIG. 12 may correspond to the test framework 420 of FIG. 9. As described above with reference to FIG. 9, the test framework 420' of FIG. 12 may receive the test data T_DAT and the test configuration data T_CON and generate the test result data T_RES. As shown in FIG. 12, the test framework 420' may include a test case parser 421, a test case generator 422, a test case library 423, a test manager 424, and a verdict or decision manager 425.

The test case parser 421 may generate data having a tree structure by interpreting information regarding a test case included in the test data T_DAT and extracted from an MSC. For example, similar to the interpreter 130 of FIG. 2, the test case parser 421 may generate data having a tree structure including nodes corresponding to messages transmitted and received by an actor of an MSC.

The test case generator 422 may generate a test case structured to be executable by appending verdict criteria to each node of the data provided from the test case parser 421. For example, the test case generator 422 may compare values of message parameters entered by a user in the display of FIG. 10 to the data having a tree structure, as criteria for determining values of parameters of messages that each of the nodes receives or transmits. The structured test cases generated by the test case generator 422 may be stored in the test case library 423.

The test manager 424 may select a test case from the test case library 423 based on the test configuration data T_CON that includes information for controlling a test flow, and may execute the selected test case. Based on the test configuration data T_CON, the test manager 424 may re-execute some test cases, stop execution of some test cases at specific time points, skip some test cases, or set parameters during execution of the test cases. As will be described below with reference to FIG. 13, the test configuration data T_CON received by the test manager 424 may be generated as a user changes an MSC displayed through an MSC editor (e.g., the MSC editor 310 of FIG. 9) or enters additional information to the MSC.

The decision manager 425 may generate the test result data T_RES based on a result of executing a test case and verdict criteria. The test result data T_RES may be provided to a user via a user interface (e.g., the user interface 300 of FIG. 9) or may be stored in a storage device.

Figure 13:
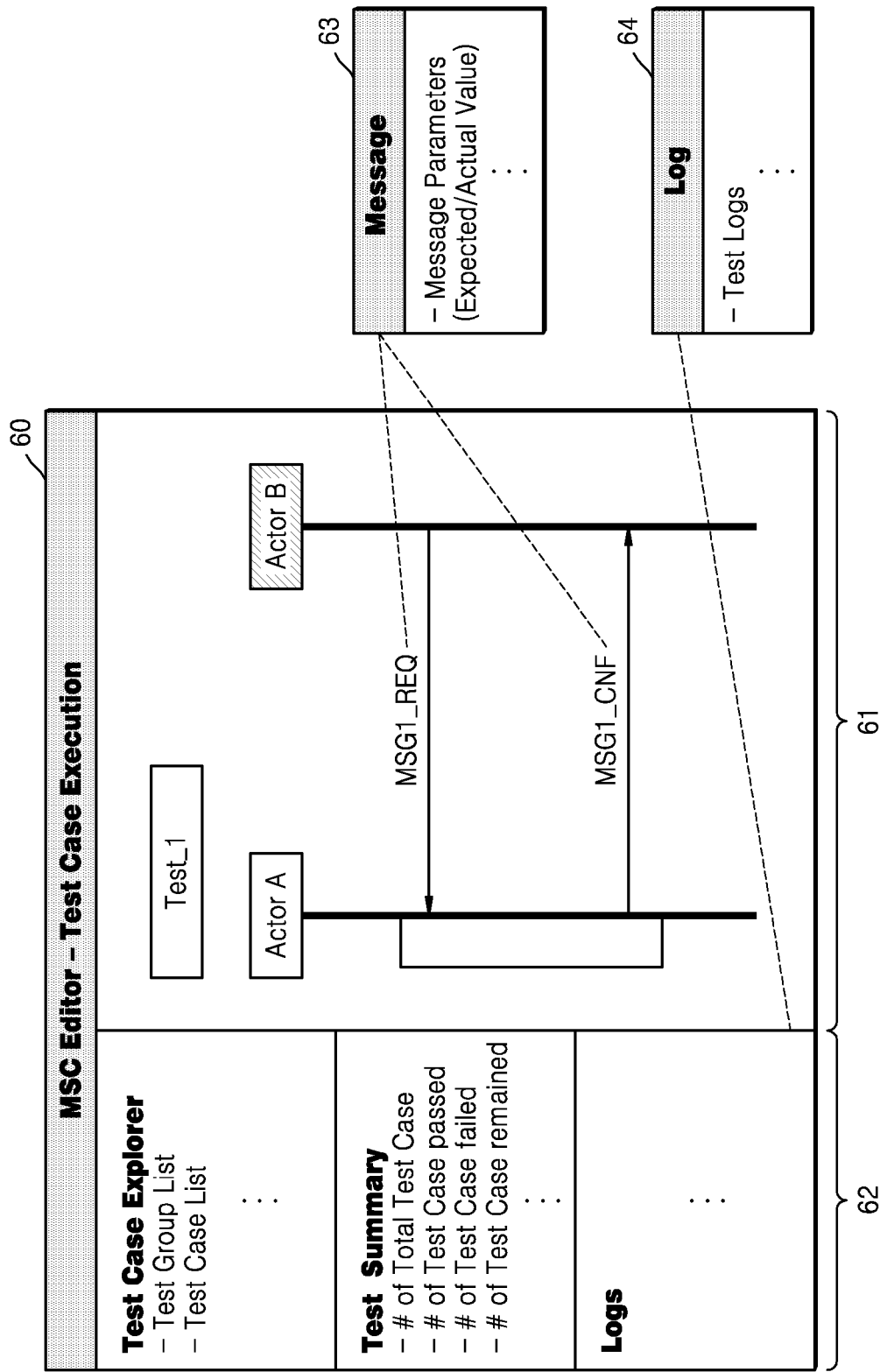
FIG. 13 is a diagram showing a display provided by the MSC editor of FIG. 9, according to an exemplary embodiment of the inventive concept.

FIG. 13 is a diagram showing a display provided by the MSC editor of FIG. 9 according to an exemplary embodiment of the inventive concept. As described above with reference to FIG. 12, the MSC editor 310 may display an MSC to display a result of executing a test case. Furthermore, the MSC editor 310 may extract the third input data D_IN3 including information regarding a test flow based on a user input.

Referring to FIG. 13, a test case executing region 60 may include an MSC region 61 and a search region 62. Similar to the MSC region 41 of FIG. 10, the MSC region 61 may display a test case defined by the user as an MSC and display a test flow. In other words, the MSC region 61 may display an execution-completed portion and an unexecuted portion of a test case, and may also display an execution aborted point defined by a user. The search region 62 may provide a tool for searching for test cases, provide summary information regarding results of executing test cases, and provide test logs.

A result of executing a test case displayed by the MSC editor 310 may include information regarding a message. For example, as shown in FIG. 13, the MSC editor 310 may provide a message display region 63 to display expected values of parameters of a message, e.g., values pre-defined based on a test case, and actual values of the parameters of the message, which are values obtained by executing the test case.

A result of executing a test case displayed by the MSC editor 310 may also include information regarding a log. For example, as shown in FIG. 13, the MSC editor 310 may provide a log display region 64 to display logs generated during execution of a test case.

Figure 14A:
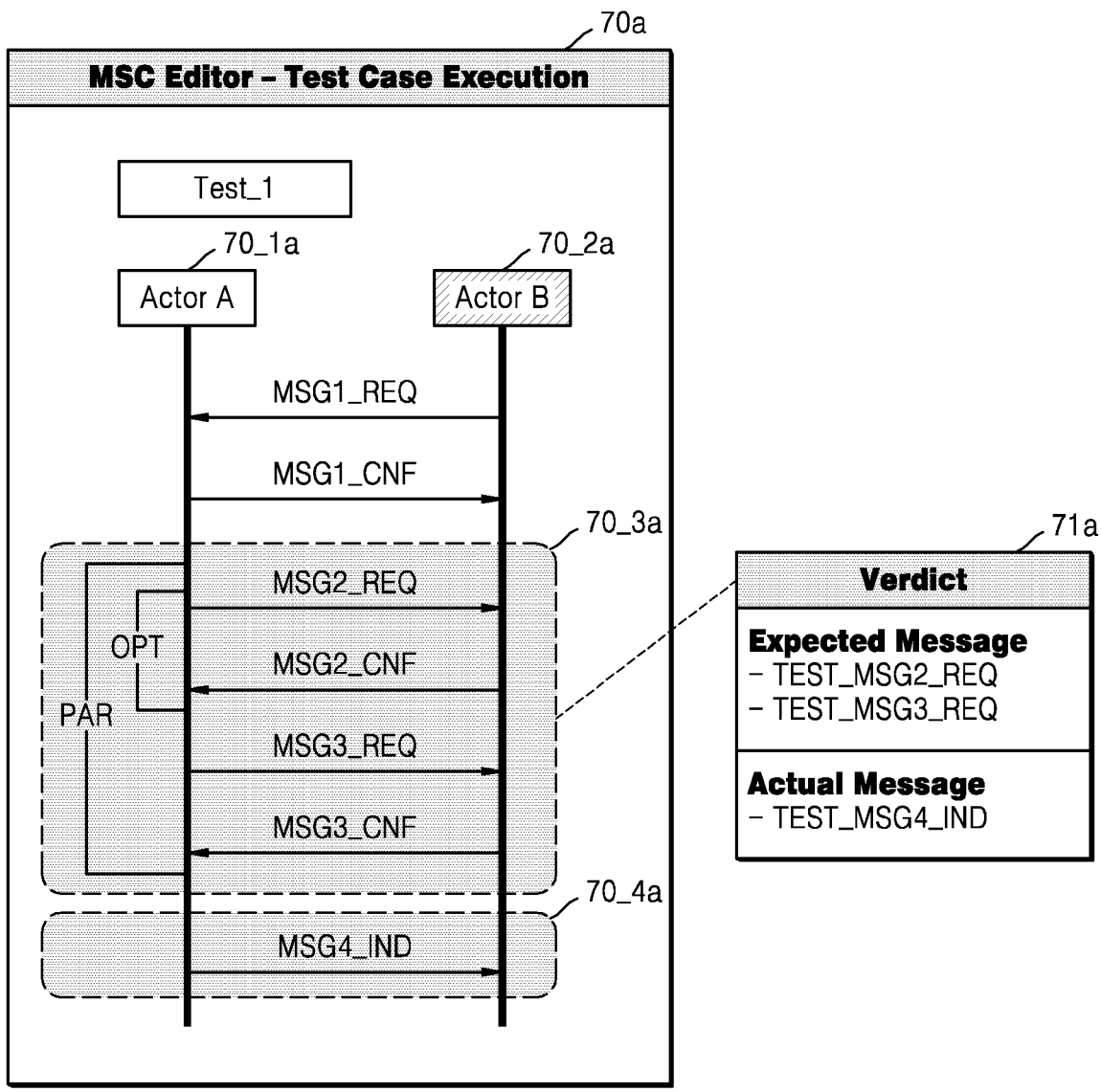
FIGS. 14A and 14B are diagrams showing a display provided by the MSC editor of FIG. 9, according to exemplary embodiments of the inventive concept.
Figure 14B:
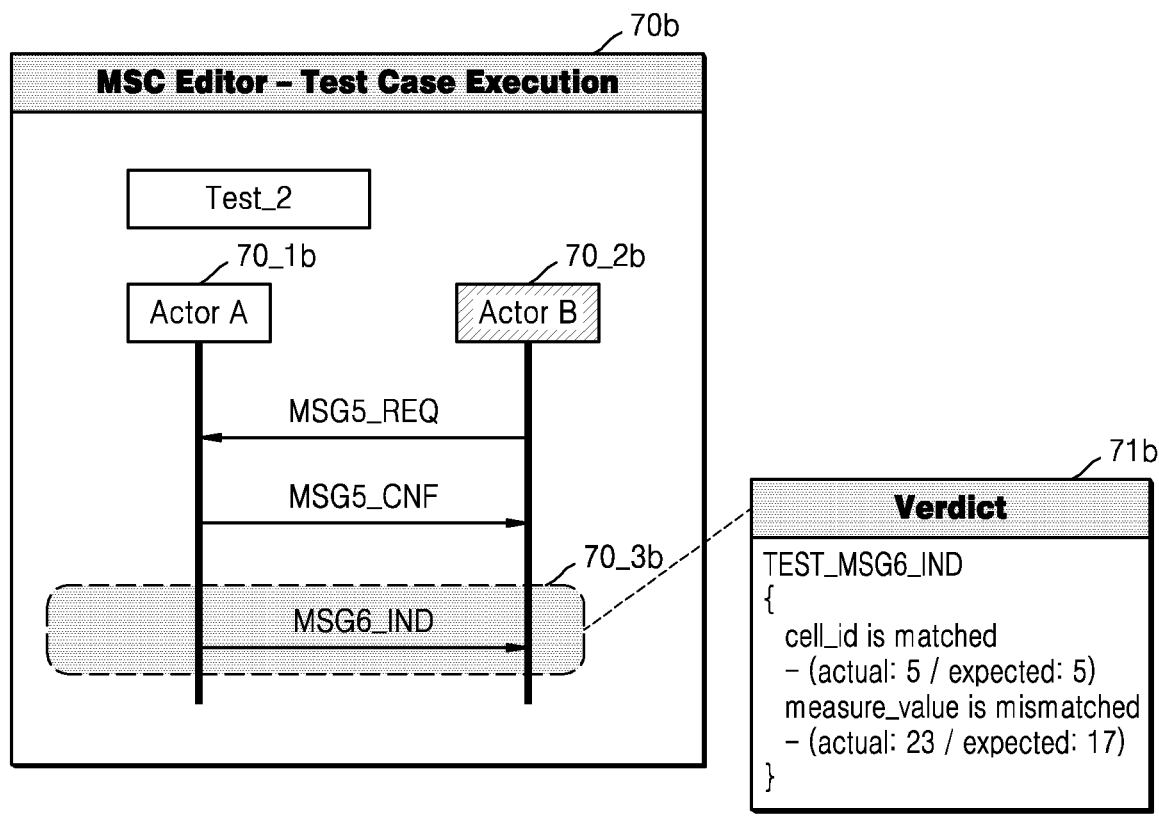

FIGS. 14A and 14B are diagrams showing a display provided by the MSC editor of FIG. 9 according to exemplary embodiments of the inventive concept. In particular, FIGS. 14A and 14B show examples of results of executing test cases displayed by the MSC editor 310.

Referring to FIG. 14A, the MSC editor 310 may display such an event when a message different from a message pre-defined in a test case is generated during execution of the test case. For example, as shown in FIG. 14A, after a message 'MSG1_CNF' is transmitted from an Actor A 70_1a to an Actor B 70_2a, a test case defines that a message 'MSG2_REQ' or a message 'MSG3_REQ' is transmitted from the Actor A 70_1a to the Actor B 70_2a. Meanwhile, according to a result of executing the test case, a message 'MSG4_IND' may be transmitted from the Actor A 70_1a to the Actor B 70_2a. A test case executing region 70a may display messages defined by the test case in a first group 70_3a and display messages according to a result of executing the test case in a second group 70_4a. Furthermore, the MSC editor 310 may provide a decision display region 71a to display detailed information regarding inconsistencies between the test case and a result of executing the test case.

Referring to FIG. 14B, the MSC editor 310 may display such an event when values of parameters of a message different from those of a message pre-defined in a test case are obtained during execution of the test case. For example, as shown in FIG. 14B, the value of a parameter 'cell_id' from among the parameters of a message 'MSG6_IND' transmitted from an Actor A 70_1b to an Actor B 70_2b may be consistent between the test case and a result of executing the test case, whereas the value of a parameter 'measure_value' may not be consistent between the test case and the result of executing the test case. A test case executing region 70b may display messages having inconsistent parameter values in a group 70_3b. Furthermore, the MSC editor 310 may provide a decision display region 71b to display detailed information regarding inconsistencies between the test case and a result of executing the test case.

Figure 15:
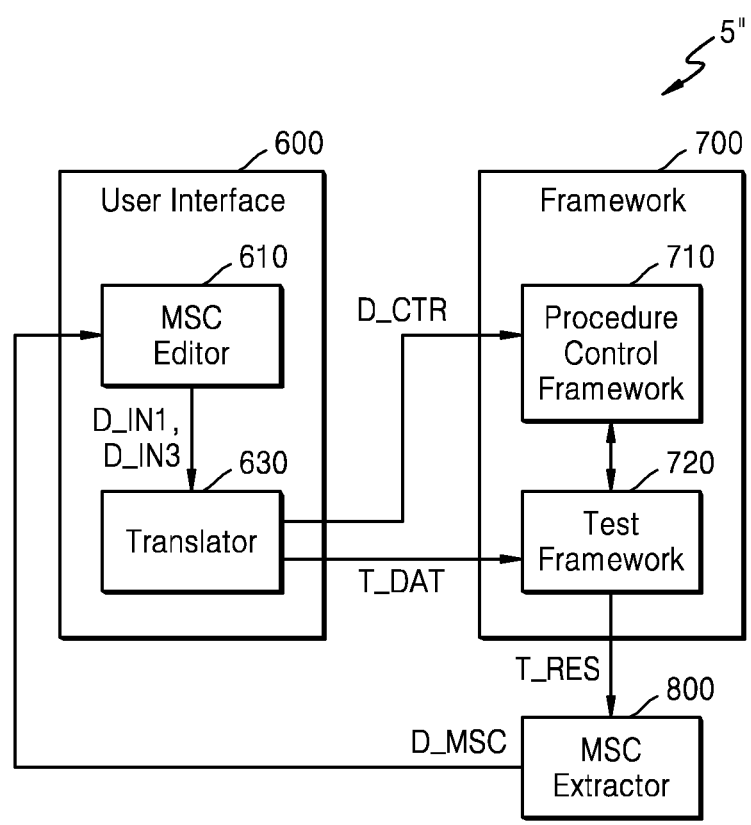
FIG. 15 is a block diagram showing a software development platform according to an exemplary embodiment of the inventive concept.

FIG. 15 is a block diagram showing a software development platform according to an exemplary embodiment of the inventive concept.

Similar to the software development platform 5' of FIG. 9, a software development platform 5" of FIG. 15 is a program. The software development platform 5" or at least a portion thereof may be stored in at least one of the RAM 12, the non-volatile memory 13, and the storage device 16 of FIG. 1, and may be executed by the processor(s) 11 to perform operations for software development.

Compared to the software development platform 5' of FIG. 9, the software development platform 5" of FIG. 15 may further include an MSC extractor 800. Hereinafter, descriptions of FIG. 15 identical to the descriptions given above with reference to FIG. 9 will be omitted.

As shown in FIG. 15, a user interface 600 may include an MSC editor 610 and a translator or interpreter 630 and may further include a relationship editor and a message handler editor. The MSC editor 610 may display an MSC according to MSC data D_MSC provided from the MSC extractor 800. As will be described below, the MSC data D_MSC is generated from the test result data T_RES, and an MSC displayed by the MSC editor 610 may be used by a user to define a procedure or a test case. In other words, the MSC editor 610 may extract the first input data D_IN1 and/or the third input data D_IN3 from an MSC changed based on a user input, and the interpreter 630 may provide the control data D_CTR and/or the test data T_DAT to a framework 700 by interpreting the first input data D_IN1 and/or the third input data D_IN3. The framework 700 may include a procedure control framework 710 and a test framework 720, and the test framework 720 may generate the test result data T_RES by executing a test case.

The MSC extractor 800 may generate the MSC data D_MSC based on the test result data T_RES. As described above with reference to FIG. 13, the test result data T_RES may include logs generated during execution of a test case. The MSC extractor 800 may collect information regarding actors, messages, and parameters of the messages from these logs and may generate the MSC data D_MSC representing an MSC from the collected information.

Figure 16:
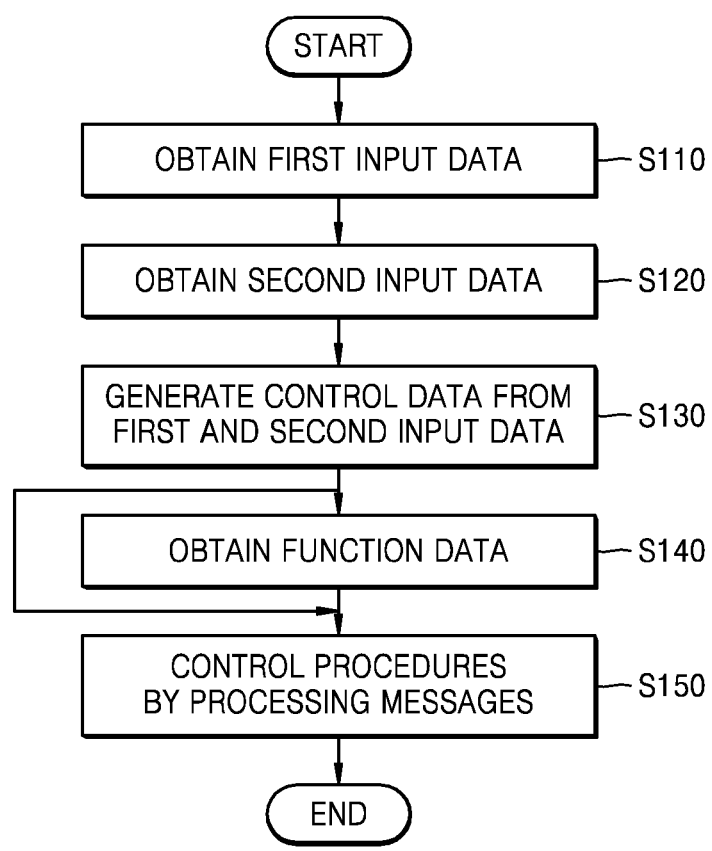
FIG. 16 is a flowchart showing a method of developing software, according to an exemplary embodiment of the inventive concept.

FIG. 16 is a flowchart showing a method of developing software according to an exemplary embodiment of the inventive concept.

For example, the method of FIG. 16 may be performed by the software development platform 5 of FIG. 2. Hereinafter, description of FIG. 16 will be given with reference to FIG. 2.

Referring to FIG. 16, an operation for obtaining the first input data D_IN1 may be performed in operation S110. The first input data D_IN1 may refer to data including information regarding a procedure designed by a user. For example, the MSC editor 110 may extract the first input data D_IN1 based on a user input. Detailed description of operation S110 will be given below with reference to FIG. 17.

In operation S120, an operation for obtaining the second input data D_IN2 may be performed. The second input data D_IN2 may refer to data including information regarding relationships between a plurality of procedures. For example, the relationship editor 120 may extract the second input data D_IN2 based on a user input.

In operation S130, an operation for generating the control data D_CTR from the first and second input data D_IN1 and D_IN2 may be performed. For example, the interpreter 130 may generate the control data D_CTR corresponding to a portion (e.g., a control logic) responsible for processing a series of messages and processing relationships between procedures by interpreting the first and second input data D_IN1 and D_IN2. As described above with reference to FIG. 4, the control data D_CTR may include data having a tree structure including nodes corresponding to messages and tables indicating relationships between procedures.

In operation S140, an operation for obtaining the function data D_FUN may be performed. For example, the message handler editor 140 may extract the function data D_FUN corresponding to a portion (e.g., a function logic or a message handler) responsible for processing a message in a procedure from a user input. As shown in FIG. 16, after operation S130 is performed, operation S150 may be performed instead of operation S140.

In operation S150, an operation for controlling procedures by processing messages may be performed. For example, the procedure control framework 210 may trigger, execute, or terminate a procedure based on information regarding procedures and messages included in the control data D_CTR. As shown in FIG. 16, when the function data D_FUN is obtained in operation S140, the procedure control framework 210 may process a message according to a message handler based on the function data D_FUN.

Figure 17:
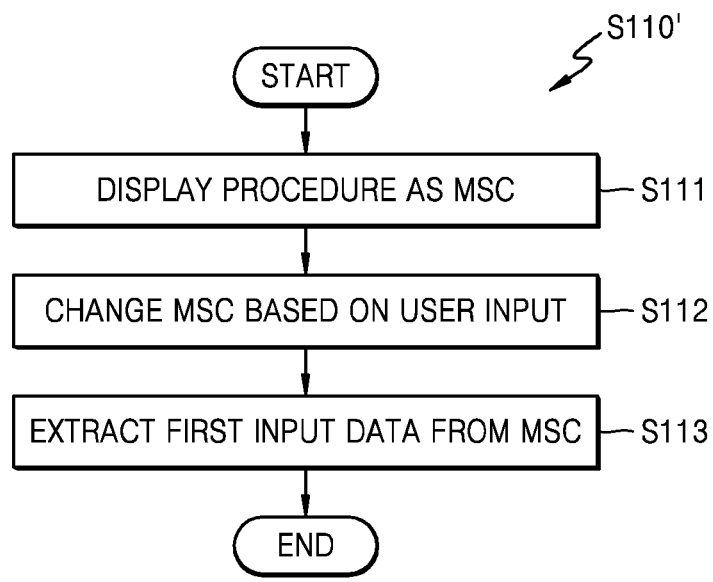
FIG. 17 is a flowchart showing an operation of FIG. 16 to obtain first input data, according to an exemplary embodiment of the inventive concept.

FIG. 17 is a flowchart showing an operation of FIG. 16 to obtain first input data, according to an exemplary embodiment of the inventive concept. Operation S110' of FIG. 17 may correspond to operation S110 of FIG. 16. As described above with reference to FIG. 16, in operation S110', an operation for obtaining the first input data D_IN1 may be performed. For example, operation S110' of FIG. 17 may be performed by the software development framework 5 of FIG. 2. Hereinafter, a description of FIG. 17 will be given with reference to FIG. 2.

Referring to FIG. 17, an operation for displaying a procedure as an MSC may be performed in operation S111, and an operation for changing the MSC based on a user input may be performed in operation S112. In operation S113, an operation for extracting the first input data D_IN1 from the MSC may be performed. For example, the MSC editor 110 may display a procedure defining a series of messages between actors as an MSC and may change (e.g., add, delete, or edit) the MSC based on a user input. The MSC editor 110 may extract the first input data D_IN1 from the changed MSC.

Figure 18:
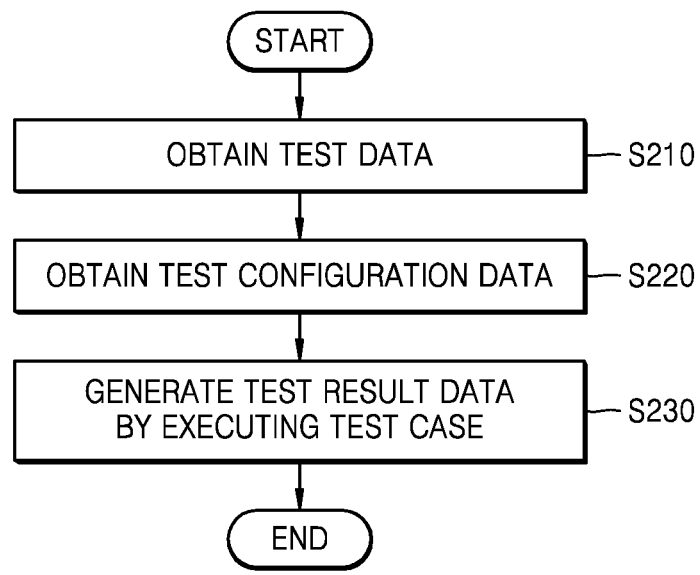
FIG. 18 is a flowchart showing a method of developing software, according to an exemplary embodiment of the inventive concept.

FIG. 18 is a flowchart showing a method of developing software according to an exemplary embodiment of the inventive concept. In particular, FIG. 18 is a flowchart showing a method of testing software during software development. For example, the method of FIG. 18 may be performed by the software development framework 5' of FIG. 9. Hereinafter, a description of FIG. 18 will be given with reference to FIG. 9.

Referring to FIG. 18, an operation for obtaining the test data T_DAT may be performed in operation S210, and an operation for obtaining the test configuration data T_CON may be performed in operation S220. For example, similar to operation S110' of FIG. 17, the test editor 310 may display an MSC and extract the third input data D_IN3 from the MSC that is changed based on an user input. The third input data D_IN3 may include information regarding a test case and information regarding control of a test flow. The interpreter 330 may generate the test data T_DAT and the test configuration data T_CON by interpreting the third input data D_IN3. Furthermore, the test data T_DAT may also be obtained from the test data store 500.

In operation S230, an operation for generating the test result data T_RES by executing a test case may be performed. For example, the test framework 420 may generate a test case structured to be executable from the test data T_DAT and, by executing the test case according to the test configuration data T_CON, generate the test result data T_RES. The test result data T_RES may be transmitted to the user interface 300 and displayed. Furthermore, as shown in FIG. 15, an MSC may be extracted by the MSC extractor 800 from logs included in the test result data T_RES and the extracted MSC may be displayed by the MSC editor 610.

While the inventive concept has been particularly shown and described with reference to exemplary embodiments thereof, it will be understood by those of ordinary skill in the art that various changes in form and details may be made thereto without departing from the spirit and scope of the inventive concept as set forth in following claims.

What is claimed is:

1. A method of operating a procedure control framework in a software development platform, the method comprising:
 obtaining control data including information regarding a plurality of procedures defining a series of messages and information regarding relationships between the plurality of procedures;
 determining that a message is received;
 determining a type of the message as one of a procedure trigger message, a procedure internal message, and an arbitrary message;
 performing a first operation when the type of the message is the procedure internal message or the arbitrary message; and
 performing a second operation when the type of the message is the procedure trigger message,
 wherein the second operation comprises:
  generating a first procedure using the control data;
  determining a relationship between the first procedure and a second procedure in a run queue of the procedure control framework by using the control data; and
  performing a third operation according to the determined relationship,
 wherein when the determined relationship indicates that the first procedure is to be performed after the second procedure is aborted, the third operation comprises:
  moving the second procedure from the run queue to an abort queue of the procedure control framework; and
  executing a procedure abort handler on all procedures in the abort queue, and
 wherein when the determined relationship indicates that the second procedure is not to be aborted, the third operation comprises:
  deferring execution of the first procedure until the second procedure terminates when the determined relationship indicates the first and second procedures are not to be run concurrently and to defer execution of the first procedure.

2. The method of claim 1, wherein when the determined relationship indicates that the first procedure is to be performed concurrently with the second procedure, the third operation comprises:
 performing a first node of the first procedure; and
 inserting the first procedure into the run queue.

3. The method of claim 1, wherein when the determined relationship indicates that the first procedure is to be deferred until termination of the second procedure, the third operation comprises:
 inserting the first procedure into a defer queue of the procedure control framework.

4. The method of claim 1, wherein the first operation comprises:
 searching for a procedure in a run queue and retrieving the procedure;
 determining whether the retrieved procedure can process the message;
 invoking a message handler when it is determined that the retrieved procedure can process the message;
 determining whether a last node of the retrieved procedure has been reached after invoking the message handler; and
 deleting the retrieved procedure from the run queue when the last node has been reached.

5. The method of claim 1, wherein when the determined relationship indicates that the first procedure is ignored, the third operation is terminated.

* * * * *